(12) United States Patent
Kwon

(10) Patent No.: US 10,057,623 B2
(45) Date of Patent: *Aug. 21, 2018

(54) DISPLAY APPARATUS AND CONTROL METHOD THEREOF

(71) Applicant: SAMSUNG ELECTRONICS CO., LTD., Suwon-si (KR)

(72) Inventor: Yong-hwan Kwon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/415,613

(22) Filed: Jan. 25, 2017

(65) Prior Publication Data

US 2017/0134790 A1 May 11, 2017

Related U.S. Application Data

(63) Continuation of application No. 14/221,793, filed on Mar. 21, 2014, now Pat. No. 9,788,045, which is a
(Continued)

(30) Foreign Application Priority Data

Aug. 6, 2010 (KR) .......................... 10-2010-0075902

(51) Int. Cl.
*G06F 3/041* (2006.01)
*H04N 21/4227* (2011.01)
(Continued)

(52) U.S. Cl.
CPC ....... *H04N 21/4227* (2013.01); *G06F 3/0488* (2013.01); *G06F 3/04883* (2013.01);
(Continued)

(58) Field of Classification Search
CPC .............. G06F 3/04883; H04N 21/482; H04N 21/42208; H04N 21/42224; H04N 5/4403; H04N 2005/443
(Continued)

(56) References Cited

U.S. PATENT DOCUMENTS 5,532,753 A 7/1996 Buchner et al.
6,002,401 A * 12/1999 Baker ............... G06F 17/30067
345/473
(Continued)

FOREIGN PATENT DOCUMENTS

DE 10 2009 006661 A1 8/2010
EP 1 847 918 A2 10/2007
(Continued)

OTHER PUBLICATIONS

Communication dated Apr. 8, 2016 issued by the U.S. Patent and Trademark Office in counterpart U.S. Appl. No. 13/155,068.
(Continued)

*Primary Examiner* — Prabodh M Dharia
(74) *Attorney, Agent, or Firm* — Sughrue Mion, PLLC

(57) ABSTRACT

A display apparatus includes: an image processor; a display unit; a remote controller which includes a touch input unit to detect motion of a user; a remote control signal receiver which receives a remote control signal from the remote controller corresponding to the motion of a user; and a controller which displays the content information window as if the content information window enters from an outside of a display area to an inside of the display area in accordance with the motion that a user moves from an outside of an area of the touch input unit to an inside of the area, or stops displaying the content information window as if the content information window exits from the inside of the display area to the outside of the display area in accordance with the
(Continued)

motion that a user moves from the inside of the area of the touch input unit to the outside of the touch input unit.

11 Claims, 21 Drawing Sheets

Related U.S. Application Data continuation of application No. 13/155,068, filed on Jun. 7, 2011, now Pat. No. 9,479,817.

(51) Int. Cl.
| | | |
|---|---|---|
| G06F 3/0488 | (2013.01) | |
| H04N 5/44 | (2011.01) | |
| H04N 21/422 | (2011.01) | |
| H04N 21/482 | (2011.01) | |
| H04N 21/431 | (2011.01) | |
| H04N 21/84 | (2011.01) | |
| H04N 5/445 | (2011.01) | |
| G06F 3/0482 | (2013.01) | |

(52) U.S. Cl.
CPC ....... *H04N 5/4403* (2013.01); *H04N 5/44543* (2013.01); *H04N 5/44582* (2013.01); *H04N 21/42208* (2013.01); *H04N 21/42209* (2013.01); *H04N 21/42224* (2013.01); *H04N 21/4312* (2013.01); *H04N 21/482* (2013.01); *H04N 21/4821* (2013.01); *H04N 21/84* (2013.01); *G06F 3/0482* (2013.01); *H04N 2005/443* (2013.01); *H04N 2005/4408* (2013.01)

(58) Field of Classification Search
USPC .......... 345/156–184; 348/734; 715/786, 863
See application file for complete search history.

(56) References Cited

U.S. PATENT DOCUMENTS

| 6,912,293 | B1* | 6/2005 | Korobkin | G06T 17/10 |
| | | | | 345/420 |
| 7,757,252 | B1 | 7/2010 | Agasse | |
| 7,966,568 | B2 | 6/2011 | Kim | |
| 8,350,807 | B2* | 1/2013 | Park | G06F 3/0485 |
| | | | | 345/156 |
| 8,643,790 | B2* | 2/2014 | Chun | G06F 3/038 |
| | | | | 345/173 |
| 2003/0071855 | A1 | 4/2003 | Kim | |
| 2003/0090524 | A1 | 5/2003 | Segerberg et al. | |
| 2004/0088727 | A1 | 5/2004 | Kamiya | |
| 2004/0100484 | A1 | 5/2004 | Barrett | |
| 2006/0026521 | A1 | 2/2006 | Hotelling et al. | |
| 2007/0016877 | A1* | 1/2007 | Shirakawa | H04N 5/44508 |
| | | | | 715/810 |
| 2007/0106945 | A1 | 5/2007 | Kim | |
| 2007/0152981 | A1 | 7/2007 | Im et al. | |
| 2007/0300252 | A1 | 12/2007 | Acharya et al. | |
| 2008/0168402 | A1 | 7/2008 | Blumenberg | |
| 2008/0218524 | A1 | 9/2008 | Takagi | |
| 2008/0282190 | A1 | 11/2008 | Kagaya | |
| 2009/0019401 | A1 | 1/2009 | Park et al. | |
| 2009/0073132 | A1 | 3/2009 | Lee et al. | |
| 2009/0073136 | A1* | 3/2009 | Choi | G06F 3/0233 |
| | | | | 345/173 |
| 2009/0094562 | A1 | 4/2009 | Jeong et al. | |
| 2009/0109183 | A1 | 4/2009 | Carvajal et al. | |
| 2009/0179869 | A1* | 7/2009 | Slotznick | G06F 3/0202 |
| | | | | 345/173 |
| 2009/0278792 | A1* | 11/2009 | Toebes | G06F 21/83 |
| | | | | 345/156 |
| 2009/0293007 | A1 | 11/2009 | Duarte et al. | |
| 2009/0313660 | A1* | 12/2009 | Ni | H04N 5/4403 |
| | | | | 725/78 |
| 2010/0073312 | A1 | 3/2010 | Son et al. | |
| 2010/0103125 | A1 | 4/2010 | Kim et al. | |
| 2010/0153999 | A1 | 6/2010 | Yates | |
| 2010/0164959 | A1 | 7/2010 | Brown et al. | |
| 2010/0164993 | A1* | 7/2010 | Yoshida | G06F 3/0346 |
| | | | | 345/650 |
| 2010/0180298 | A1 | 7/2010 | Kim et al. | |
| 2010/0277337 | A1* | 11/2010 | Brodersen | G06F 3/04883 |
| | | | | 340/12.54 |
| 2010/0302172 | A1 | 12/2010 | Wilairat | |
| 2011/0037851 | A1 | 2/2011 | Kim et al. | |
| 2011/0102321 | A1* | 5/2011 | Son | G06F 3/0346 |
| | | | | 345/158 |
| 2011/0141012 | A1* | 6/2011 | Noh | G06F 3/0488 |
| | | | | 345/157 |
| 2011/0227911 | A1* | 9/2011 | Joo | H04N 13/004 |
| | | | | 345/419 |
| 2011/0267291 | A1* | 11/2011 | Choi | G06F 3/0346 |
| | | | | 345/173 |
| 2012/0194427 | A1* | 8/2012 | Lee | G06F 3/0346 |
| | | | | 345/157 |
| 2012/0198386 | A1* | 8/2012 | Hautala | G06F 3/0481 |
| | | | | 715/838 |
| 2012/0208639 | A1* | 8/2012 | Reynolds | G06F 3/0488 |
| | | | | 463/36 |
| 2012/0256835 | A1* | 10/2012 | Musick, Jr. | A63F 13/2145 |
| | | | | 345/161 |
| 2013/0057764 | A1* | 3/2013 | Choi | H04N 21/42222 |
| | | | | 348/563 |
| 2013/0076642 | A1* | 3/2013 | Rampson | G06F 3/0488 |
| | | | | 345/173 |
| 2013/0106888 | A1* | 5/2013 | Penner | G06F 3/0484 |
| | | | | 345/582 |
| 2013/0120254 | A1* | 5/2013 | Mun | G06F 3/0482 |
| | | | | 345/158 |
| 2013/0182192 | A1* | 7/2013 | Kim | H04N 21/42204 |
| | | | | 348/734 |
| 2014/0068669 | A1 | 3/2014 | Knudson et al. | |
| 2014/0232671 | A1* | 8/2014 | Chaudhri | G06F 9/4443 |
| | | | | 345/173 |
| 2014/0340323 | A1* | 11/2014 | Jang | G06F 3/0416 |
| | | | | 345/173 |

FOREIGN PATENT DOCUMENTS

| EP | 2045700 A1 | 4/2009 |
| EP | 2166444 A1 | 3/2010 |
| JP | 7-226983 A | 8/1995 |
| JP | 2002-55750 A | 2/2002 |
| JP | 2002-513255 A | 5/2002 |
| JP | 2005-38306 A | 2/2005 |
| JP | 2005-348036 A | 12/2005 |
| JP | 2008-217742 A | 9/2008 |
| JP | 2008-276705 A | 11/2008 |
| JP | 2009-245012 A | 10/2009 |
| KR | 10-2003-0030485 A | 4/2003 |
| KR | 10-2008-0073389 A | 8/2008 |
| KR | 10-2009-0029133 A | 3/2009 |
| WO | 00/05887 A1 | 2/2000 |
| WO | 03/043318 A1 | 5/2003 |

OTHER PUBLICATIONS

Communication dated Aug. 27, 2015 issued by the U.S. Patent and Trademark Office in counterpart U.S. Appl. No. 13/155,068.
Communication dated Jan. 15, 2015 issued by the United States Patent and Trademark Office in counterpart U.S. Appl. No. 13/155,068.
Communication dated Jul. 6, 2015 issued by the Japanese Patent Office in counterpart Japanese Patent Application No. 2011-092911.
Communication dated Mar. 9, 2015 issued by the Japanese Patent Office in counterpart Japanese Patent Application No. 2011-092911.
Communication dated Oct. 20, 2016, issued by the European Patent Office in counterpart European application No. 11165533.8.

(56) References Cited

OTHER PUBLICATIONS

Communication dated Oct. 6, 2015 issued by the European Patent Office in counterpart European Patent Application No. 11 165 533.8.
Communication issued Aug. 16, 2016, issue by the Korean Intellectual property Office in counterpart Korean Patent Application No. 10-2010-0075902.
Communication dated Jul. 25, 2016, issued by the Japanese Patent Office in counterpart Japanese Patent Application No. 2015-155448.
Communication dated Mar. 27, 2014; in corresponding European Application No. 11165533.8.
USPTO Office Action dated Jul. 15, 2014 issued in co-pending U.S. Appl. No. 13/155,068.
Korean Decision of Rejection dated Jan. 3, 2017.
USPTO Office Action dated Aug. 27, 2015 issued in co-pending U.S. Appl. No. 14/221,793.
USPTO Office Action dated Mar. 10. 2016 issued in co-pending U.S. Appl. No. 14/221,793.
Communication dated Jun. 20, 2017 issued by the European Patent Office in counterpart European Patent in counterpart European Patent Application No. 11 165 533.8.
Communication issued by the European Patent Office dated Nov. 9, 2017 in counterpart European Patent Application No. 17186954.8.

\* cited by examiner

FIG. 14B
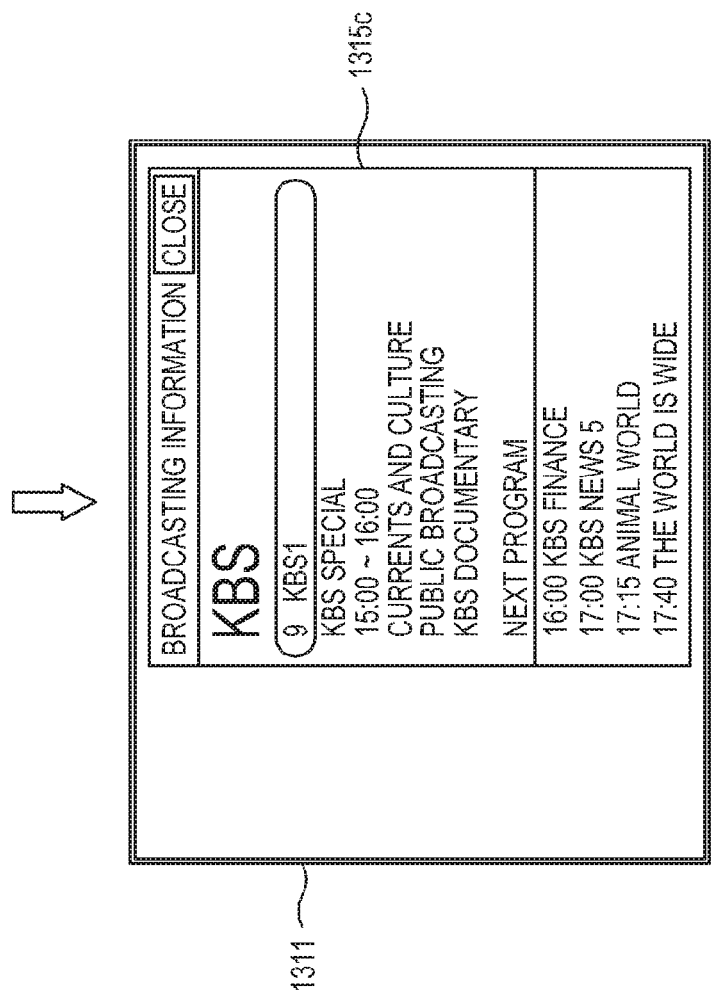
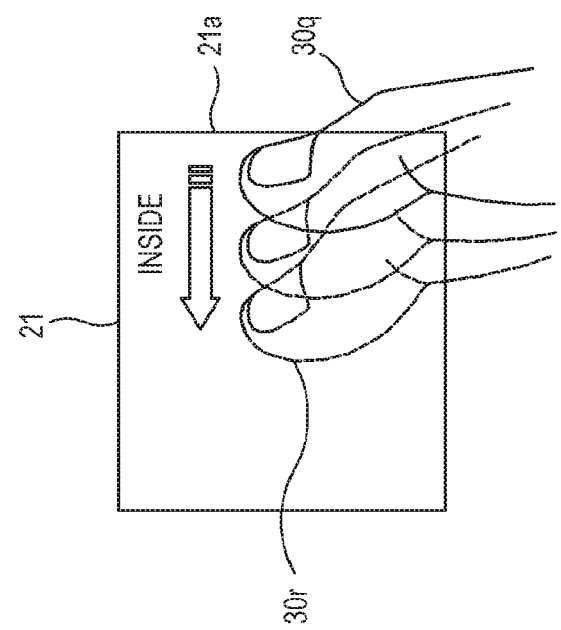

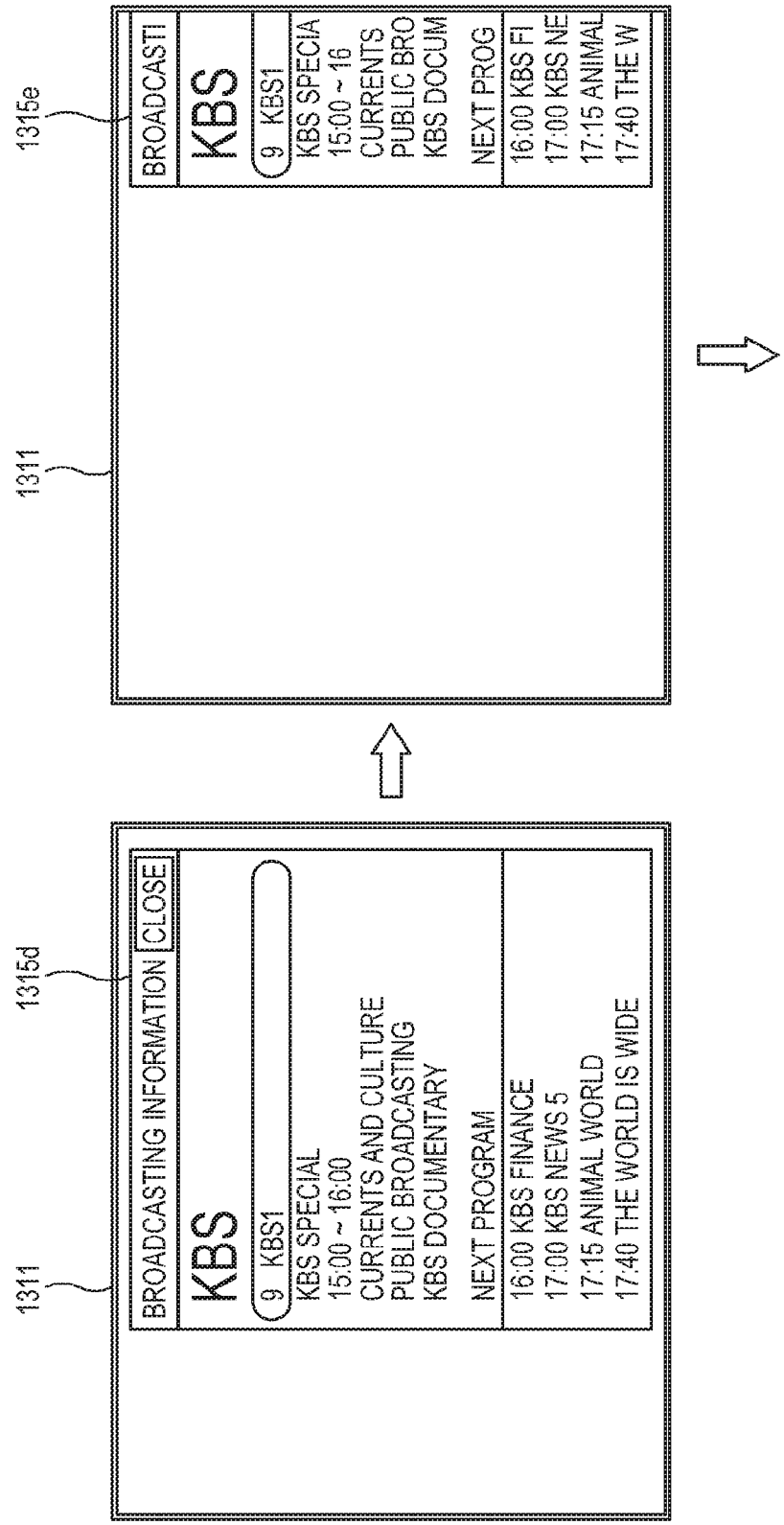

FIG. 15B
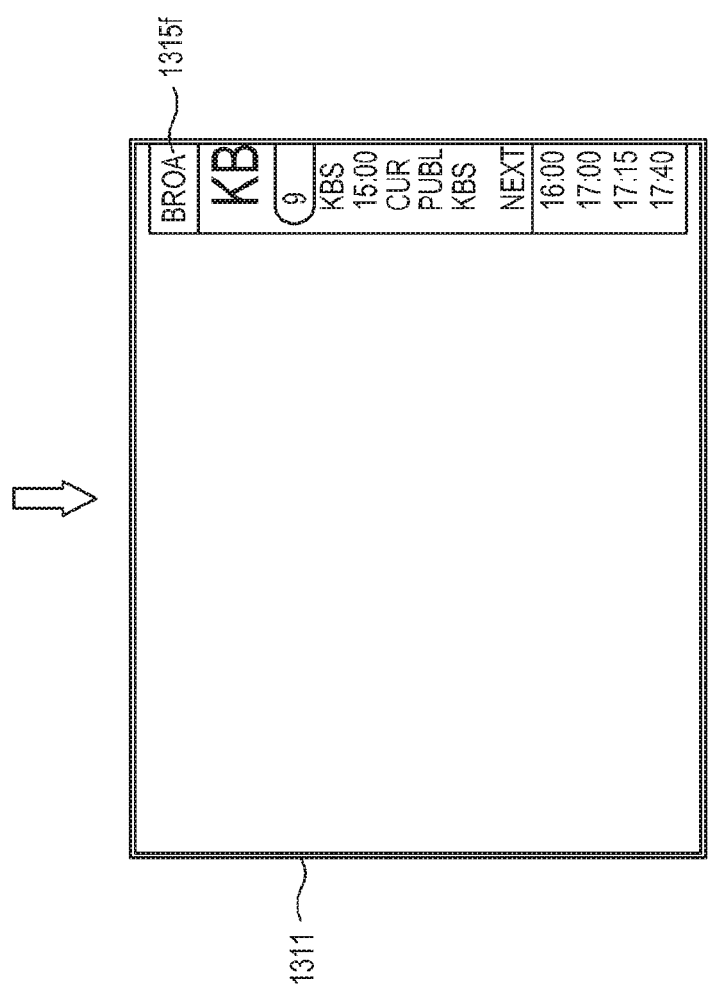
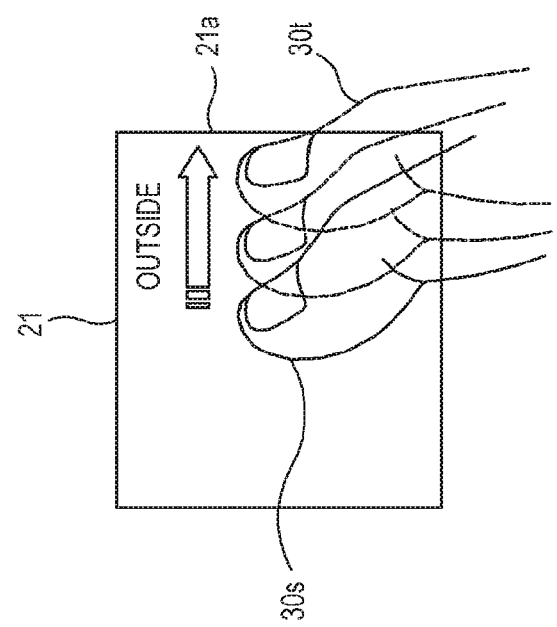

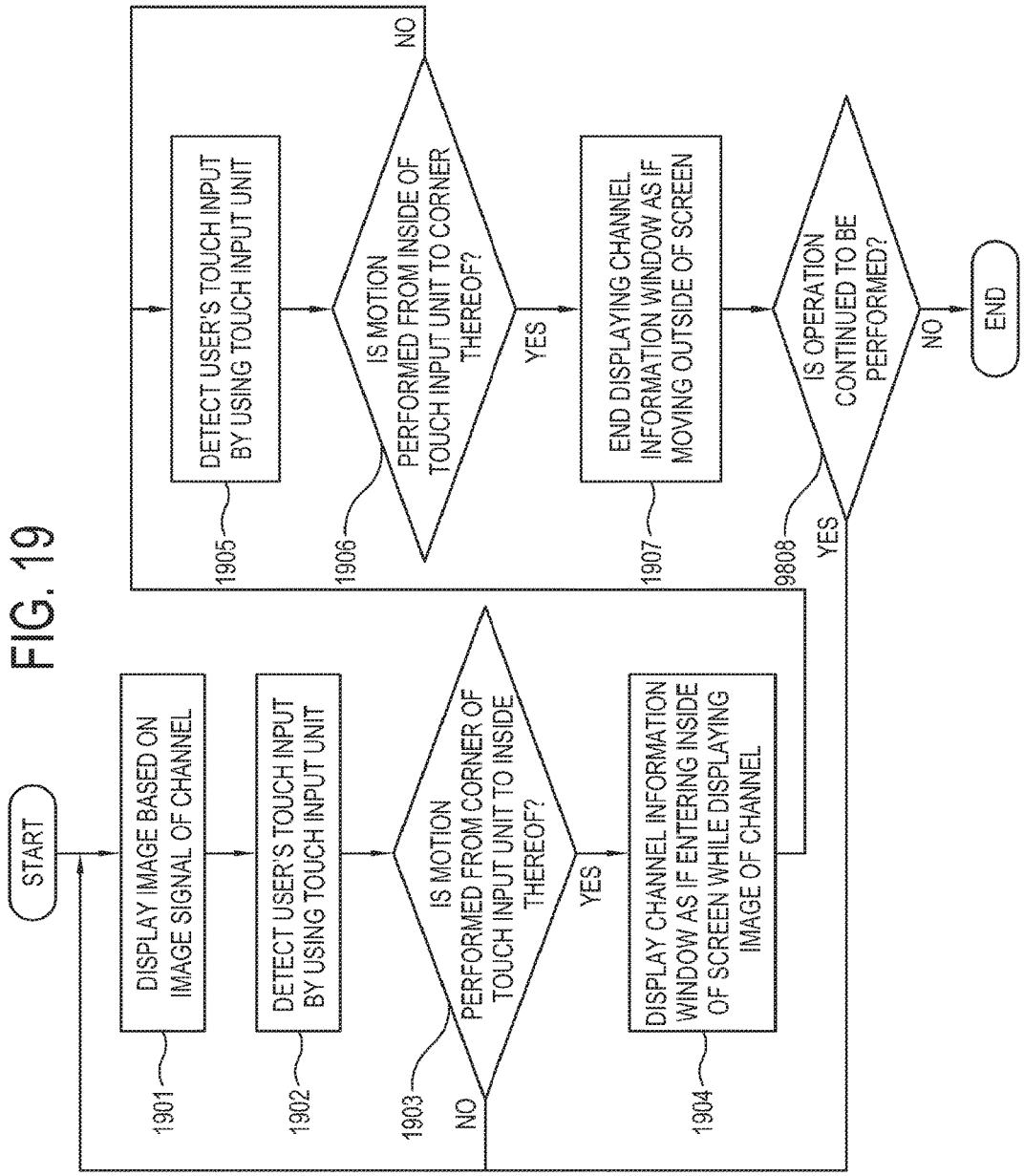

DISPLAY APPARATUS AND CONTROL METHOD THEREOF

CROSS-REFERENCE TO RELATED APPLICATIONS

This is a continuation application of U.S. patent application Ser. No. 14/221,793 filed Mar. 21, 2014 in the U.S. Patent and Trademark Office, which is a continuation application of U.S. application Ser. No. 13/155,068, filed Jun. 7, 2011 in the U.S. Patent and Trademark Office, now U.S. Pat. No. 9,479,817 issued Oct. 25, 2016, which claims priority from Korean Patent Application No. 10-2010-0075902, filed on Aug. 6, 2010 in the Korean Intellectual Property Office, the disclosures of which are incorporated herein by reference in their entireties.

BACKGROUND

Field

Apparatuses and methods consistent with the exemplary embodiments relate to a display apparatus and a control method thereof, and more particularly, to a display apparatus and a control method thereof which enables a user to search a plurality of channels in a remote place by using a remote controller.

Related Art

A display apparatus, such as a TV, displays thereon an image based on a broadcasting signal received from a broadcasting station or an image signal from an image device such as a digital versatile disc (DVD) (hereinafter, to be called "image signal" collectively).

The image signal may include a broadcasting content, a movie content and other various image contents, and a display apparatus provides a user interface (UI) menu for a user to conveniently search a desired content among the foregoing image contents. Further, the display apparatus includes a remote controller, through which a user may select an image content more conveniently in a remote place.

However, more and more image contents can be viewed from the display apparatus recently, and many technologies have been proposed to easily search numerous image contents, but still a convenient and useful UI menu has been difficult to attain. Also, the remote controller of the display apparatus typically employs buttons, and searching the numerous image contents by pushing button by button is very inconvenient.

SUMMARY

Accordingly, one or more exemplary embodiments provide a display apparatus and a control method thereof which searches image contents more conveniently and promptly.

The foregoing and/or other aspects may be achieved by providing a display apparatus including: an image processor which processes at least one image of a plurality of contents; a display unit which displays the image and a content information window providing information of the content; a remote controller which is remote from the display unit and includes a touch input unit to detect motion of a user; a remote control signal receiver which receives a remote control signal from the remote controller corresponding to the motion of a user; and a controller which displays the content information window as if the content information window enters from an outside of a screen to an inside of the screen in accordance with the motion that a user moves from an outside of an area of the touch input unit to an inside of the area, or ends displaying the content information window as if the content information window escapes from the inside of the screen to the outside of the screen in accordance with the motion that a user moves from the inside of the area of the touch input unit to the outside of the touch input unit.

The remote controller may detect a first touch input of a user, and the controller may display on the display unit a user interface (UI) item for searching at least one of the plurality of contents that is determined on the basis of a first arranging order, and change the UI item of the displayed content to a UI item of a content moved as much as a movement amount corresponding to the first touch input and displays the changed UI item.

The first touch input may include a motion that is performed while contacted to the touch input unit.

The movement amount may correspond to a movement distance of the motion.

The movement amount may correspond to a speed of the motion.

The movement amount may include a unit of a page which includes a plurality of contents to be displayed on the display unit at a time.

The UI item of the plurality of contents may be arranged in a grid.

The UI item of the plurality of contents may be arranged in a band.

The UI item may be displayed together with an image of a currently selected content.

The remote controller may detect a second touch input to the touch input unit, and the controller may start or end displaying the UI menu while an image of the content is displayed corresponding to the second touch input.

The remote controller may detect a third touch input to the touch input unit, and the plurality of contents may be classified into a plurality of categories, and the controller may display the UI menu of a content belonging to at least one of the plurality of categories determined on the basis of a second arranging order, and change a UI menu of the displayed content to a UI menu of a content belonging to a category moved as much as a movement amount corresponding to the third touch input and displays the changed UI menu.

The first touch input may correspond to a motion performed in a first direction, and the third touch input may correspond to a motion performed in a second direction that is different from the first direction.

The first and second directions may correspond to one of an up and down direction and a left and right direction, respectively.

The controller may determine a movement of the content and the category based on the movement amount in the up and down direction and the left and right direction by the motion if a touch input of the motion is performed in a diagonal direction.

An aspect of another exemplary embodiment provides a control method of a display apparatus which includes a remote controller, the control method including: detecting motion of a user a touch input unit provided in the remote controller; receiving a remote control signal corresponding to the motion of a user; and displaying a content information window, which provides information about at least one image among the plurality of contents, as if the content information window enters from an outside of a screen to an inside of the screen in accordance with the motion that a user moves from an outside of an area of the touch input unit to an inside of the area, or ending displaying the content information window as if the content information window escapes from the inside of the screen to the outside of the screen in accordance with the motion that a user moves from the inside of the area of the touch input unit to the outside of the touch input unit.

The control method may further include displaying a user interface (UI) item of at least one content that is determined on the basis of a first arranging order to search the plurality of contents; detecting a user's first touch input by using the touch input unit; receiving a remote control signal corresponding to the first touch input; and changing the UI item of the displayed content to a UI item of a content that moves as much as a movement amount corresponding to the first touch input and displaying the changed UI item.

The first touch input may include a motion that is performed while being contacted to the touch input unit.

The movement amount may correspond to a movement distance of the motion.

The movement amount may correspond to a speed of the motion.

The movement amount may include a unit of a page which includes a plurality of contents to be displayed on the display unit at a time.

The UI item of the plurality of contents may be arranged in a grid.

The UI item of the plurality of contents may be arranged in a band.

The UI item may be displayed together with an image of a currently selected content.

The control method may further include: displaying an image of the content; detecting a user's second touch input by using the touch input unit; and starting or ending displaying the UI item while the image is displayed corresponding to the second touch input.

The control method may further include displaying the UI item of a content belonging to at least one of a plurality of categories that is determined on the basis of a second arranging order among the plurality of categories to which the plurality of contents is classified and belongs; detecting a user's third touch input by using the touch input unit; and changing the UI item of the displayed content to a UI item of a content belonging to a category moved as much as a movement amount corresponding to the third touch input and displaying the changed UI item.

The first touch input may correspond to a motion that is performed in a first direction, and the third touch input may correspond to a motion that is performed in a second direction that is different from the first direction.

The first and second directions may correspond to one of up and down direction and left and right direction, respectively.

The control method may further include: detecting a user's fourth touch input of a motion performed in a diagonal direction by using the touch input unit; and determining a movement of the content and the category based on each movement amount in the up and down direction and the left and right direction by the motion.

BRIEF DESCRIPTION OF THE DRAWINGS

The above and/or other aspects will become apparent and more readily appreciated from the following description of the exemplary embodiments, taken in conjunction with the accompanying drawings, in which:

FIGS. 14A and 14B illustrate starting a display of the channel information window in FIG. 13;

FIGS. 15A and 15B illustrates ending a display of the channel information window in FIG. 13; and FIGS. 16 to 19 are flowcharts of a control method of the display apparatus according to the exemplary embodiment.

DETAILED DESCRIPTION OF EXEMPLARY EMBODIMENTS

Figure 1:
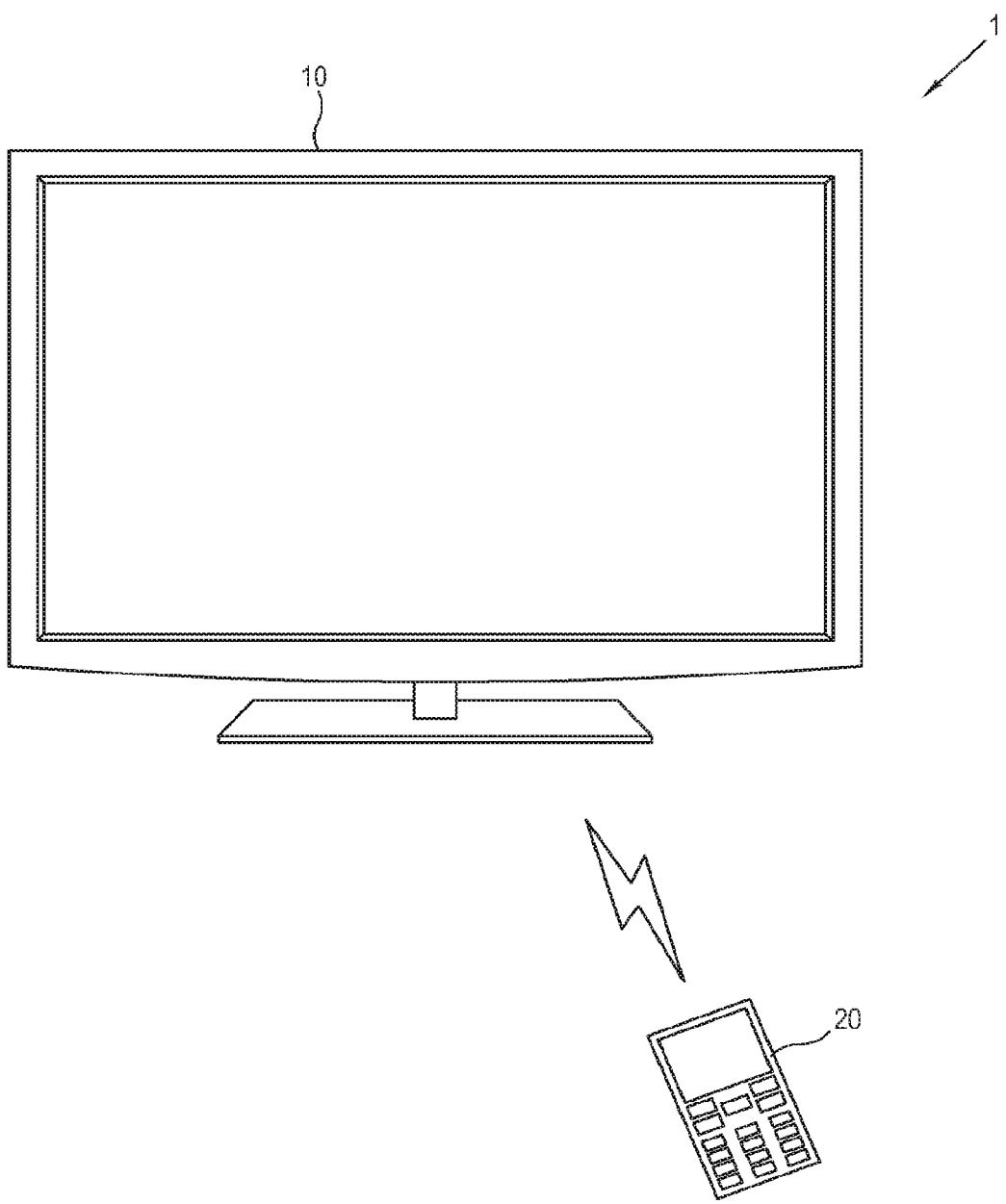
FIG. 1 illustrates a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates a display apparatus 1 according to an exemplary embodiment. The display apparatus 1 may include a TV. The display apparatus 1 includes a display main body 10 to display an image thereon, and a remote control device 20 to control the display main body 10 according to a user's manipulation. The remote control device 20 is separately provided from the display apparatus 1, and transmits a remote control signal to the display main body 10 according to a user's manipulation, and the display main body 10 performs an operation corresponding to the remote control signal received from the remote control device 20.

Figure 2:
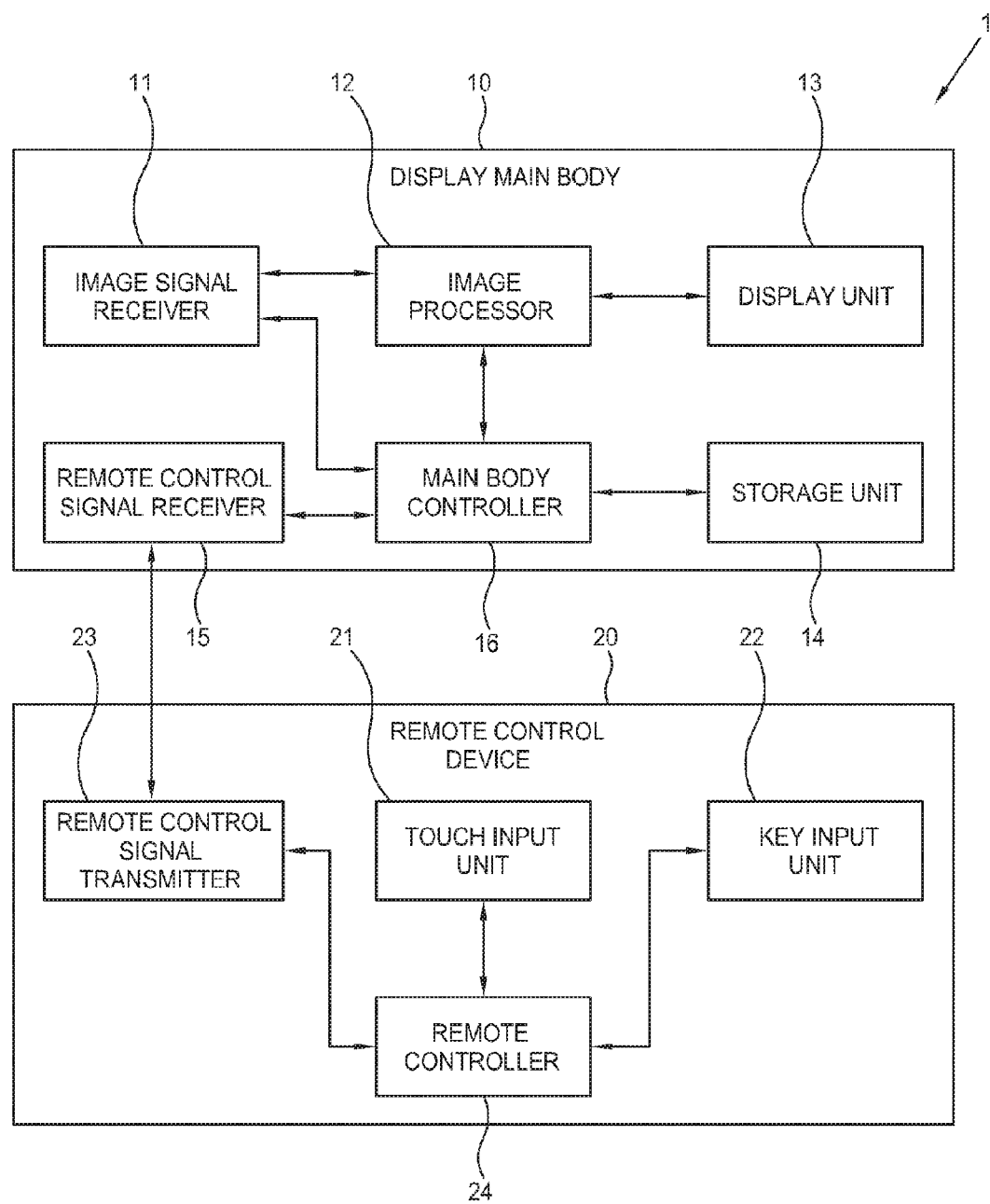
FIG. 2 is a block diagram of the display apparatus in FIG. 1.

FIG. 2 is a block diagram of the display apparatus 1 in FIG. 1. The display main body 10 includes an image signal receiver 11, an image processor 12, a display unit 13, a storage unit 14, a remote control signal receiver 15 and a main body controller 16.

The image signal receiver 11 receives an image signal including an image content. The image signal may include an audio content or a data content, or both audio and data content, as well as the image content. The image signal which is received by the image signal receiver 11 includes a broadcasting signal transmitted by a broadcasting station and a signal input by a predetermined image device. In the case of the broadcasting signal, the image signal receiver 11 may selectively receive a broadcasting signal from one of a plurality of channels. The broadcasting signal includes, for example, an airwave broadcasting, a cable broadcasting, a satellite broadcasting and other known broadcasting signals. The type of the broadcasting signal includes a digital broadcasting and an analog broadcasting. The image signal receiver 11 may process the received broadcasting signal to obtain an image content therefrom. The signal processing includes tuning, analog/digital conversion, demodulation and digital/analog conversion.

In the case of an image signal input by an image device, the image signal receiver 11 may communicate with the image device transmitting the image signal, corresponding to a characteristic of the input image signal. Such communication includes wired and wireless communications, and analog and digital communications. The communication method includes all types of communications that are known to be used to transmit the image content. The image device which supplies an image signal to the image signal receiver 11 is not limited in type, and includes a DVD player, a blue-ray disc (BD) player, a PC, a mobile phone, a smartphone and other TVs. The image signal receiver 11 may process the input image signal to obtain an image content therefrom. The processing may include an analog-digital conversion and a digital-analog conversion.

Further, the image signal receiver 11 may receive an image signal from a predetermined server through a network or an image signal from a portable storage device such as a universal serial bus (USB) storage medium. In each of the above cases, the image signal receiver 11 may communicate with a counterpart device in a given manner to receive an image signal.

In any case, the image signal receiver 11 may receive and process the image signal according to a control of the main body controller 16.

The image processor 12 processes an image content that is obtained from the image signal received by the image signal receiver 11 to display the image content. The image processing includes demultiplexing, decoding and scaling an image, and adjusting and improving a picture quality. The image processor 12 may process an image relating to a UI menu for an interface with a user. The image processor 12 may overlap at least a part of an image of the image content and an image relating to the UI menu or arrange an image by image sequential display.

The display unit 13 displays thereon an image processed by the image processor 12. The method of displaying the image by the display unit 13 is not limited, and includes all of known display methods. The display unit 13 may include an LCD, an OLED, a PDP, a projection or a CRT.

The storage unit 14 stores therein data necessary for an operation of the display main body 10. The storage unit 14 includes all types of non-volatile memories which are known to store data therein semi-permanently. The non-volatile memory may include, e.g., an electrically erasable programmable read-only memory (EEPROM), a flash memory and a hard disc drive.

The remote control signal receiver 15 receives a remote control signal that is transmitted by the remote control device 20. The remote control signal receiver 15 may correspond to the characteristic of the remote control signal transmitted by the remote control device 20. The transmission method of the remote control signal may include, e.g., infrared transmission, radio frequency (RF) communication, etc., but is not limited thereto. Alternatively, the transmission method of the remote control signal may include all types of signal transmission methods that are known to be used for a remote control. The remote control signal receiver 15 may process a remote control signal to obtain the user's input information. The remote control signal receiver 15 transmits to the main body controller 16 the received remote control signal or the obtained user's input information.

The main body controller 16 controls the display main body 10 as a whole. The main body controller 16 controls elements of the display main body 10 according to the user's input information obtained from the remote control signal received by the remote control signal receiver 15. The main body controller 16 may control the image signal receiver 11 to receive a desired image signal. The main body controller 16 may control the image processor 12 to process the image content obtained from the image signal received by the image signal receiver 11 and may control the UI menu. The main body controller 16 may store in the storage unit 14 data or read the data stored in the storage unit 14 as necessary for the above control.

The main body controller 16 may include a non-volatile memory to store therein an execution code of a computer program corresponding to the foregoing control, a volatile memory to load at least a part of the execution code stored in the non-volatile memory, and a microprocessor to execute the execution code loaded into the volatile memory.

The display main body 10 may further include other elements (not shown) necessary for the operation of the display apparatus 1. For example, the display main body 10 further include an audio signal receiver, an audio signal processor and an audio output unit to receive, process and output an audio signal, respectively, an input pad provided in the display main body 10 separately from the remote control device 20 to receive a user's command, and a power supply unit to supply power to the elements of the display main body 10.

Hereinafter, the remote control device 20 according to the exemplary embodiment will be described. As shown in FIG. 2, the remote control device 20 may include a touch input unit 21, a key input unit 22, a remote control signal transmitter 23 and a remote controller 24. The touch input unit 21 receives a user's command as an input motion, for example a touch motion, and the key input unit 22 identifies whether a preset input is selected by a user's command. The remote controller 24 transmits to the display main body 10 information of the user's input received from the touch input unit 21 and the key pad 22 as a remote control signal through the remote control signal transmitter 23. The remote control signal transmitter 23 transmits a signal corresponding to the remote control signal receiver 15 of the display main body 10.

Figure 3:
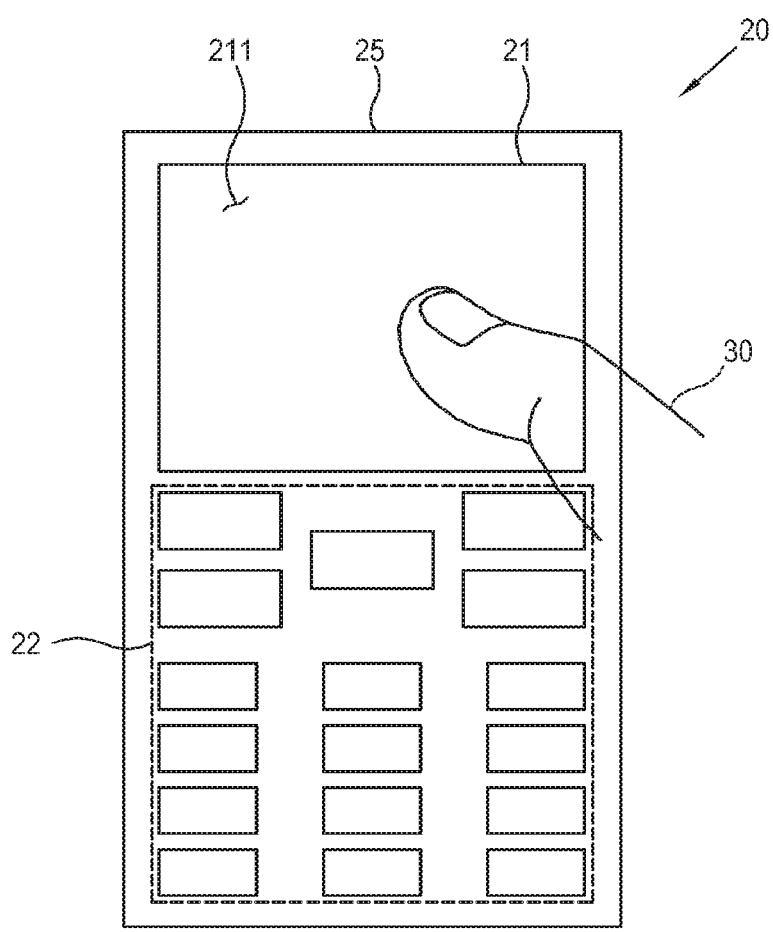
FIG. 3 illustrates a detailed external appearance of a remote control device in FIGS. 1 and 2.

FIG. 3 illustrates a detailed external appearance of the touch input unit 21 and the key input unit 22 of the remote control device 20 in FIGS. 1 and 2. As shown therein, the remote control device 20 further includes a housing 25, wherein the touch input unit 21 is exposed from an area of the housing 25 and the key input unit 22 is exposed from another area of the housing 25. The key input unit 22 includes a plurality of buttons, which matches preset key codes including numbers and characters. Numbers and characters (not shown) matching the plurality of buttons may be displayed on a surface of the plurality of buttons for the user.

The touch input unit 21 includes a contact surface 211 to be contacted by a part of the user's body. The contact surface 211 in FIG. 3 has a rectangular shape, but not limited thereto. Alternatively, the contact surface 211 includes a circular, an elliptical shape and other types of polygonal shapes.

The remote control device 20 according to the present exemplary embodiment may be gripped by a user's hand, and a thumb contacts the contact surface 211 as a representative example, as shown in FIG. 3. However, the contact between the contact surface 211 and a user's body is not limited to the foregoing, and may vary. The touch input unit 21 detects a motion of a user's finger 30 on the contact surface 211 (hereinafter, to be also called "touch input") and transmits the detection result to the remote controller 24.

Figure 4:
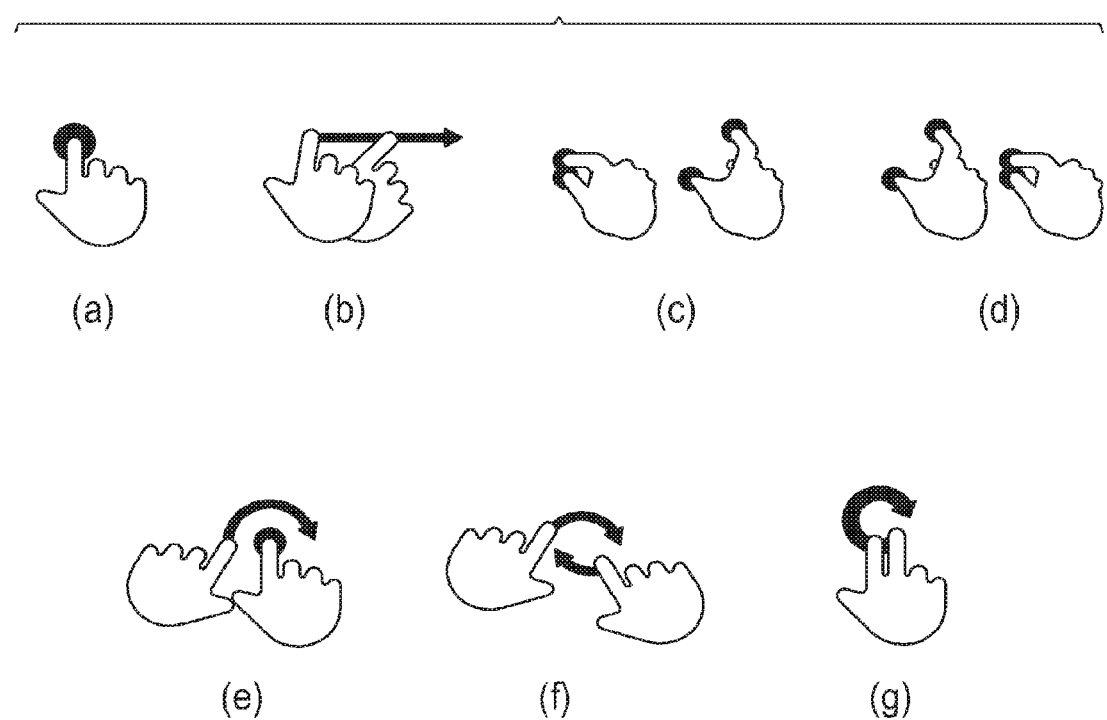
FIG. 4 illustrates various examples of a touch input by a user through a touch input unit in FIG. 3.

FIG. 4 illustrates various examples of a user's touch input by using the touch input unit 21 in FIG. 3. Likewise, the touch input in FIG. 4 includes a touch input by the user's hand, finger, or fingers, but is not limited thereto.

As shown therein, the user's touch input by using the touch input unit 21 may include: touching a temporary point of the contact surface 211, as shown in (a) of FIG. 4; moving in a predetermined direction along the contact surface 211 while contacting the contact surface 211, as shown in (b) of FIG. 4; widening a gap between fingers contacting the contact surface 211 by using at least two fingers, as shown in (c) of FIG. 4; narrowing down the gap between fingers contacting the contact surface 211 by using at least two fingers, as shown in (d) of FIG. 4; contacting and rotating a finger centering on a point where another finger contacts the contact surface 211, as shown in (e) of FIG. 4; relatively rotating contact points of two fingers, as shown in (f) of FIG. 4; and rotating at least two fingers contacting the contact surface 211, as shown in (g) of FIG. 4.

The main body controller 16 of the display main body 10 performs a control operation corresponding to a user's touch input using the touch input unit 21 of the remote control device 20. For example, the main body controller 16 may: start or end displaying the UI menu corresponding to a touch input as in (a) of FIG. 4; focus a cursor or a highlight on the UI menu, or select an item, move the cursor or the highlight corresponding to a touch input as in (b) of FIG. 4; change a page of the UI menu, move an image itself and display another undisplayed part of the image, drag and change a position of the UI menu, enlarge or reduce an image corresponding to a touch input as in (c) or (d) of FIG. 4; and rotate an image corresponding to a touch input as in (e), (f) or (g) of FIG. 4.

Hereinafter, searching the image content by using the display apparatus 1 according to the exemplary embodiment will be described. The image content which may be searched by the display apparatus 1 may include, e.g., a broadcasting content, a movie content, a photo, a video, etc., but is not limited thereto. As described above, the content which a user may search by using the display apparatus 1 is not limited to the image content, and may vary including an audio content and a data content. Hereinafter, all types of contents which the display apparatus 1 may provide is called "contents" collectively.

It is assumed that the display apparatus 1 according to the exemplary embodiment provides contents through a received broadcasting signal of a plurality of channels. The display apparatus 1 may be connected to at least one image device, and receive additional contents through an image signal input by the connected image device. Further, the display apparatus 1 may store another content in the storage unit 14 and receive the content stored in the storage unit 14.

Figure 5:
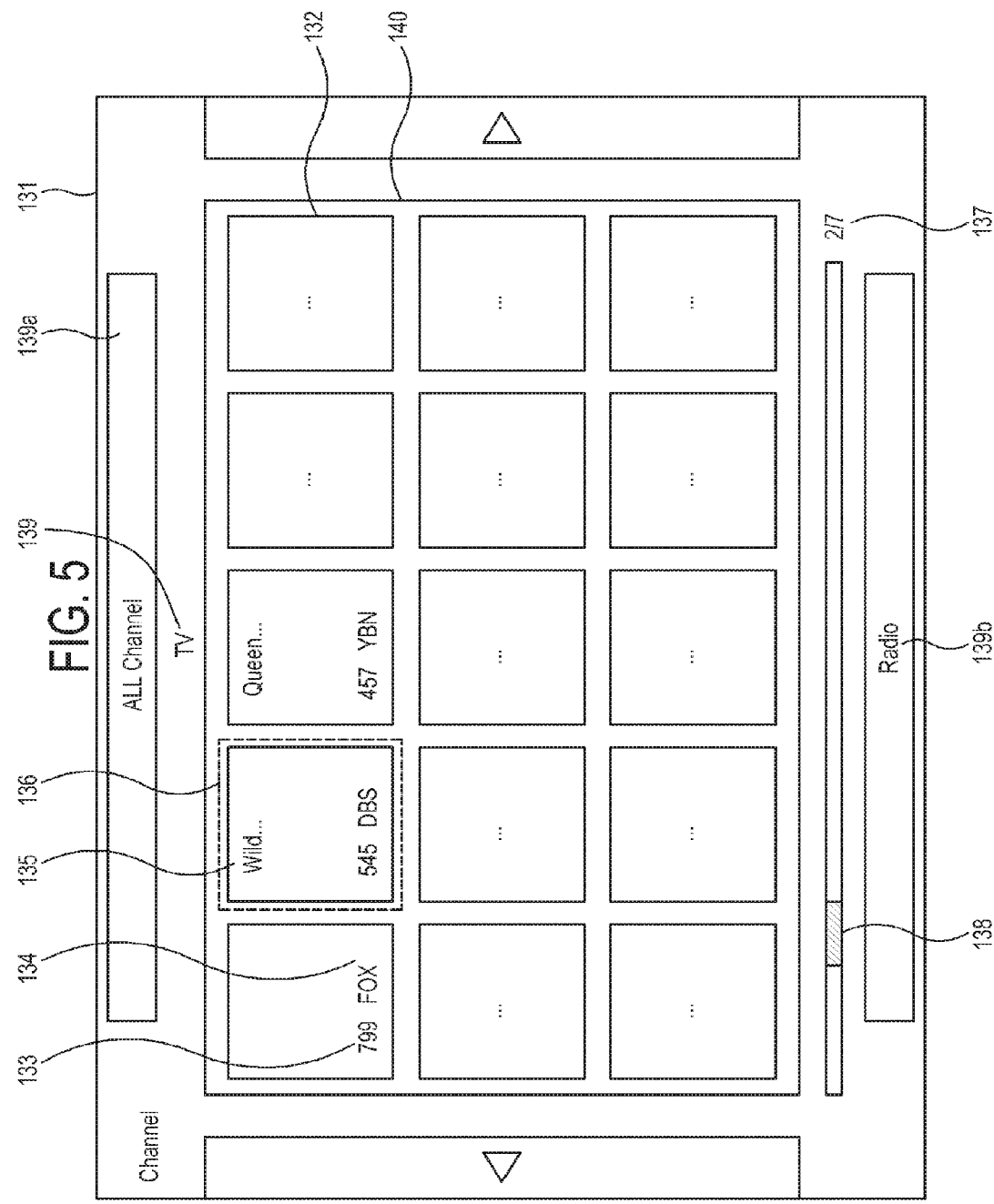
FIG. 5 illustrates an example of a UI menu displayed by the display apparatus in FIGS. 1 and 2.

The display apparatus 1 uses a UI menu to conveniently search content to be provided through various routes as described above. FIG. 5 illustrates an example of a UI menu 131 displayed by the display apparatus 1 in FIGS. 1 and 2. The main body controller 16 controls the image processor 12 to display the UI menu 131 through the display unit 13.

As shown in FIG. 5, the UI menu 131 includes a plurality of UI items 132 (only fifteen of the plurality of UI items 132 are depicted) corresponding to each of the plurality of contents to be provided. The plurality of UI items 132 are divided into a plurality of groups of UI items 140. FIG. 5 illustrates one of the groups of the UI items 140 that are arranged in a grid, but the arrangement is not limited thereto and may vary. The plurality of UI items 132 may display information of the content, e.g. a channel number 133, a channel name 134, and a tile 135 of the content. The information of the contents may include a thumbnail image of the contents (not shown). For convenience, FIG. 5 does not illustrate information of contents with respect to some of the plurality of UI items 132.

A user may search and select a desired content by using the plurality of UI items 132. The main body controller 16 highlights one of the plurality of UI items 132 for a user to select one of the plurality of UI items 132 (Refer to FIG. 5). The main body controller 16 may move a highlight 136 to another of the plurality of UI items 132 according to a user's command by using the key input unit 22 or the touch input unit 21 of the remote control device 20, and a user may select the content of one of the plurality of UI items 132 when a desired one of the plurality of UI items 132 is highlighted.

The contents which may be displayed at one tile are a part of all the contents to be provided by the display apparatus 1. In consideration of the circumstances where all of the contents may not be displayed in a screen, the display apparatus 1 displays one of the groups of UI items 140 at one time (hereinafter, to be called "page") corresponding to as much contents as may be displayed on the screen. The UI menu 131 may include information 137 and 138 of the page to which the currently displayed group of UI items 140 of the plurality of items 132 belongs. The reference numeral 137 refers to the second page of all seven pages, and the reference numeral 138 refers to a bar indicator.

Further, the display apparatus 1 may classify all of the contents by category, and display the plurality of UI items 132 of the contents by category. The category may include, e.g., entire channels, a TV input, a radio input, or an external input (corresponding to a content from an image device). The UI menu 131 may include information 139 of a category to which the contents of the currently displayed group of UI items of the plurality of UI items 132 belong.

Figure 6:
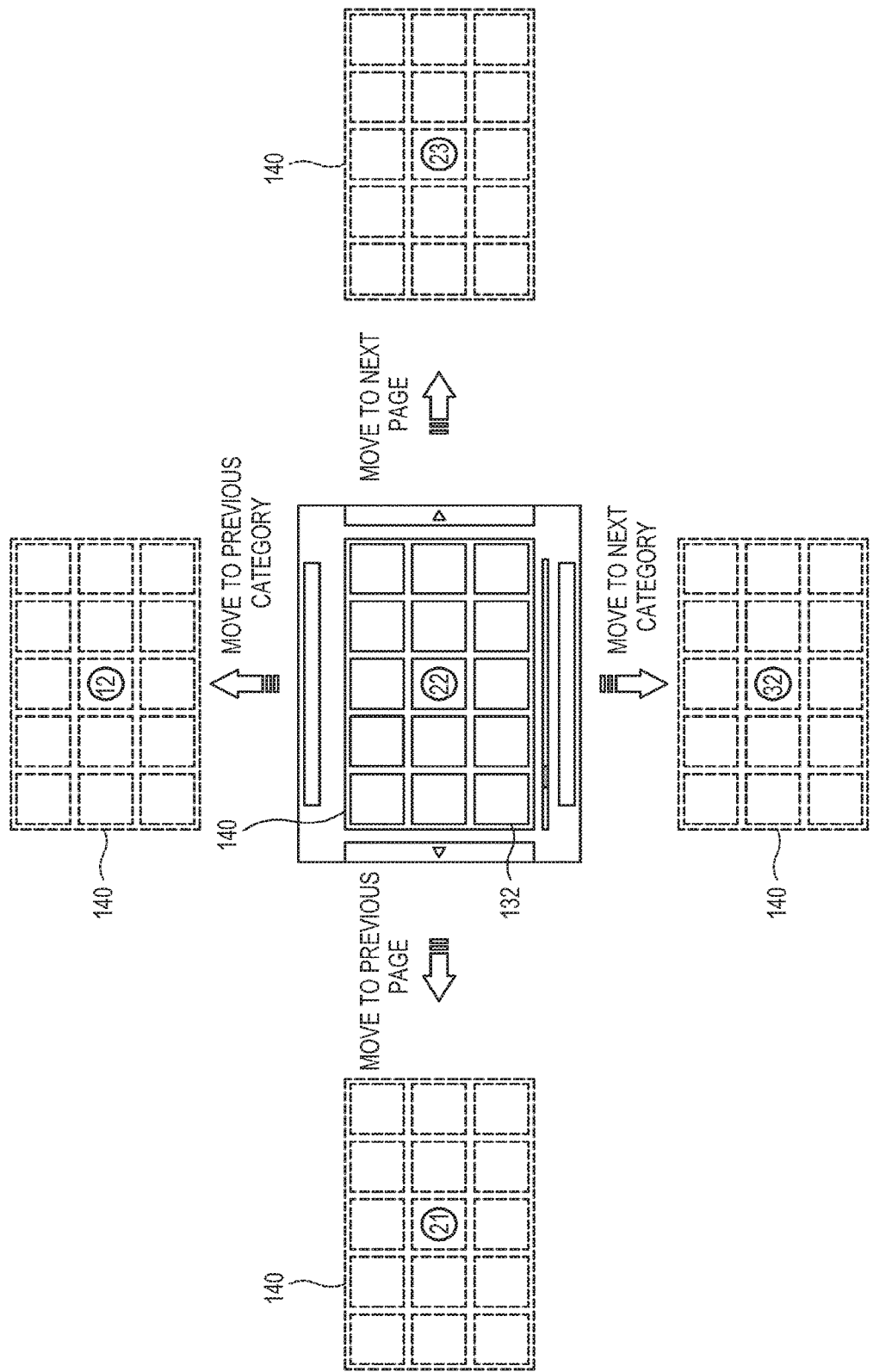
FIG. 6 illustrates a movement of a page and category displayed by the display apparatus in FIGS. 1 and 2.

According to a user's command, the main body controller 16 may change the currently displayed group of UI items 140 to display another group of UI items 140 corresponding to contents belonging to a page other than the current page or contents belonging to a category other than the current category. A user's command may be input by the key input unit 22 or the touch input unit 21 corresponding to the change of the page or category (hereinafter, to be also called "movement"). For example, the key input unit 22 includes four buttons arranged up and down and left and right, and a movement between categories may occur when the buttons arranged up and down are pushed, and a movement between pages may occur when the buttons arranged left and right are pushed. To determine content to be newly displayed when there is a movement between the pages or categories or both pages and categories, the display apparatus 1 has the order of the categories and order of contents belonging to one category set in advance according to a predetermined standard. Accordingly, the main body controller 16 determines a content to be displayed by referring to the order and displays one of the groups of UI items 140 corresponding to the determined content upon receiving a user's command for the movement between the pages or categories or both. FIG. 6 illustrates detailed movements of pages and categories. The group of UI items 140 expressed in a solid line in FIG. 6 refers to a currently displayed page and category, and the groups of UI items 140 expressed in dotted lines refer to a previous or next page or previous or next category. The reference numerals written in circles in the groups of UI items 140 refer to the arranging order of the pages or categories. For example, the movement between pages occurs in the arranging order of 21, 22 and 23, and the movement between the categories occurs in the arranging order of 12, 22 and 32. As shown in FIG. 5, the UI menu 131 may further include information 139a and 139b which inform in advance next or previous categories.

Figure 7:
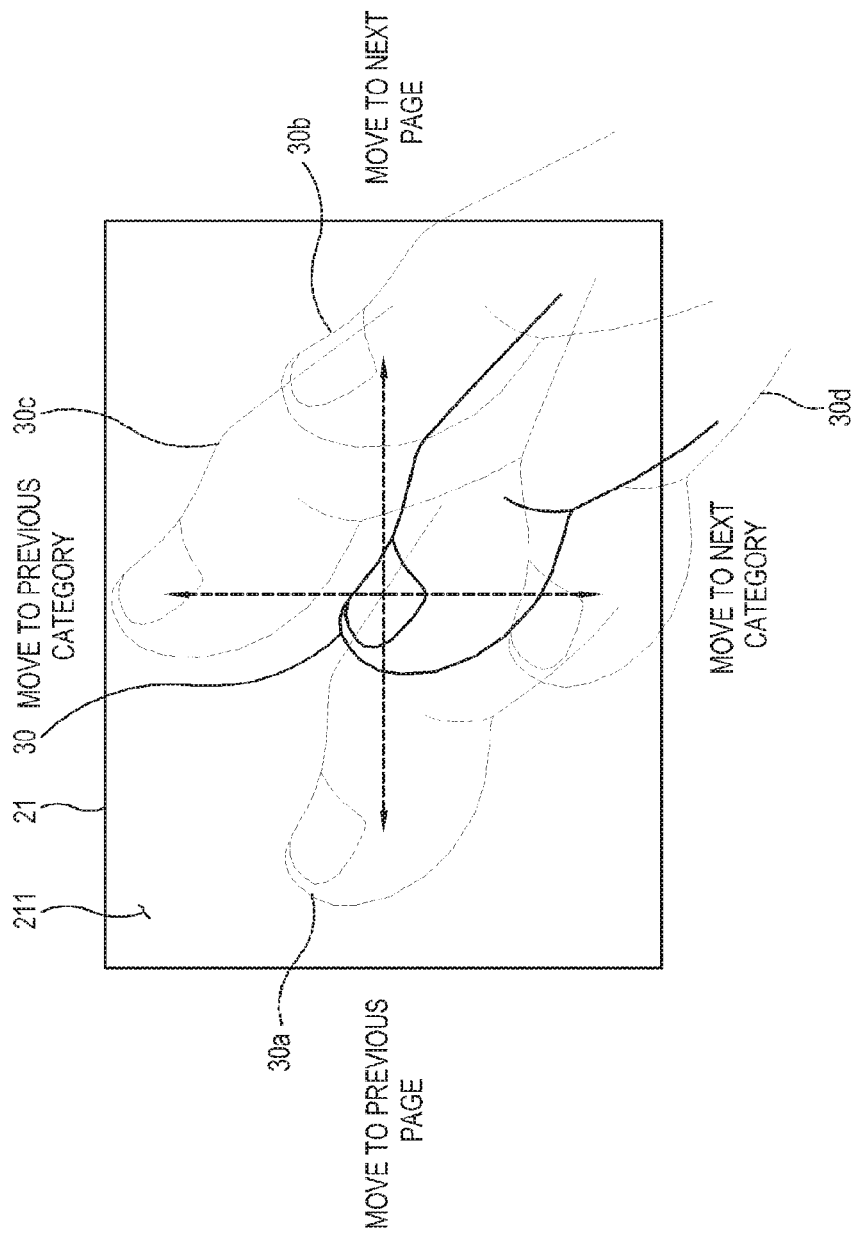
FIG. 7 illustrates an example of a user's motion commanding a movement of a page and/or a category through the touch input unit in FIG. 3.

Also, the movement between the pages or categories or both may be performed by a user's motion using the touch input unit 21. FIG. 7 illustrates an example of a user's motion commanding a movement of pages, categories, or both using the touch input unit 21. FIG. 7 illustrates a movement of a user's finger 30 as a user's motion, but the user's motion is not limited thereto.

As shown therein, a user may move a finger up and down, and left and right (refer to arrows, and the reference numerals 30a, 30b, 30c and 30d in FIG. 7) while contacting the contact surface 211 of the touch input unit 21 with the finger. The main body controller 16 may determine the movement to a next or previous page or a movement to a next or previous category depending on a direction of the user's motion on the contact surface 211, and may change and display one of the groups UI items 140 corresponding to the determination. According to the present exemplary embodiment, a movement between the categories may be performed with respect to the up and down motion 30c and 30d, and a movement between the pages may be performed with respect to the left and right motion 30a and 30b, but are not limited thereto. Alternatively, the movement may vary. Accordingly, in the display apparatus 1 according to the exemplary embodiment, a user may promptly and conveniently search a number of contents by an intuitive and simple manipulation of the touch input unit 21.

Figure 8:
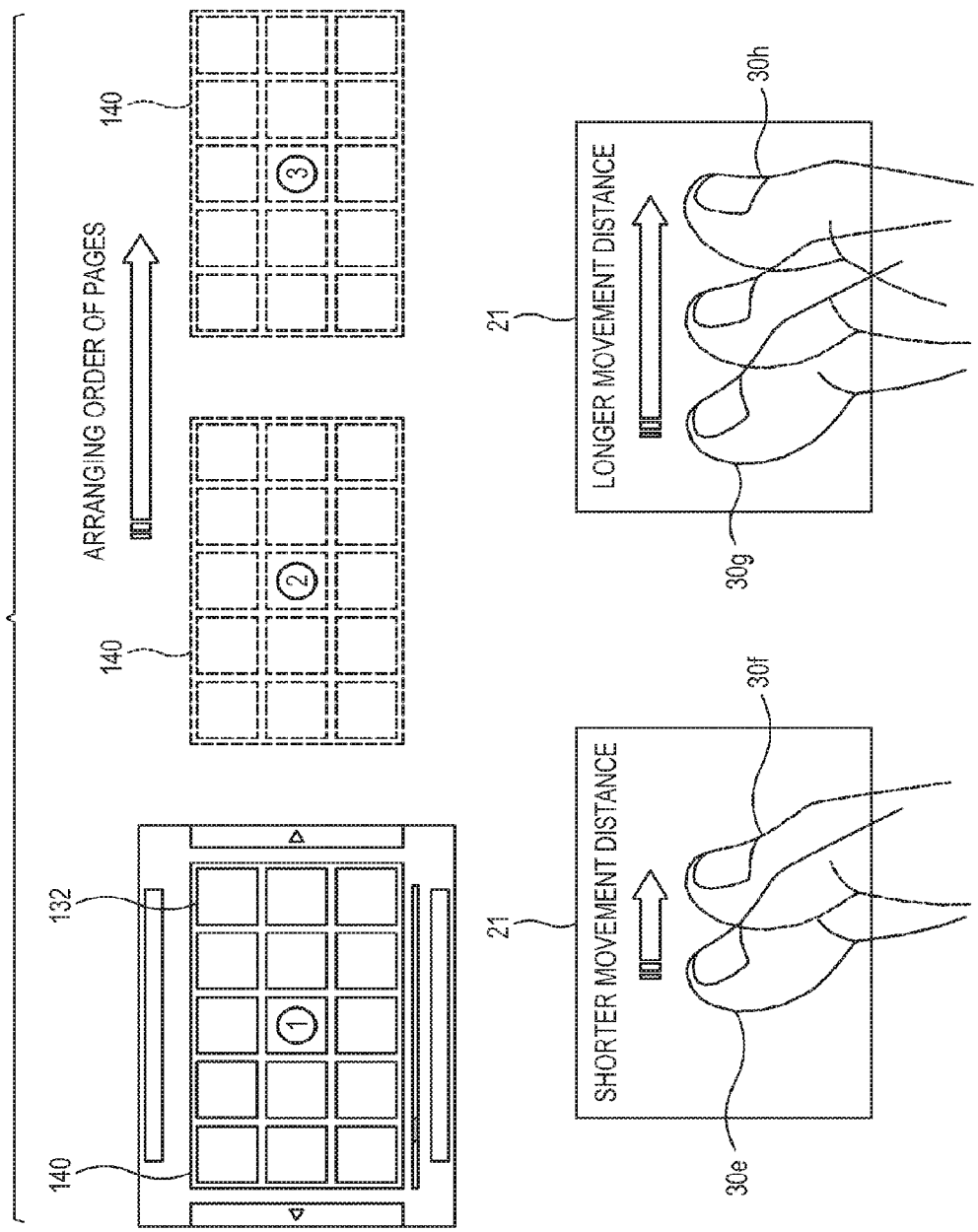
FIGS. 8 and 9 illustrate a movement amount of a page or a category corresponding to each of a movement distance and speed of a user's motion in FIG. 7.
Figure 9:
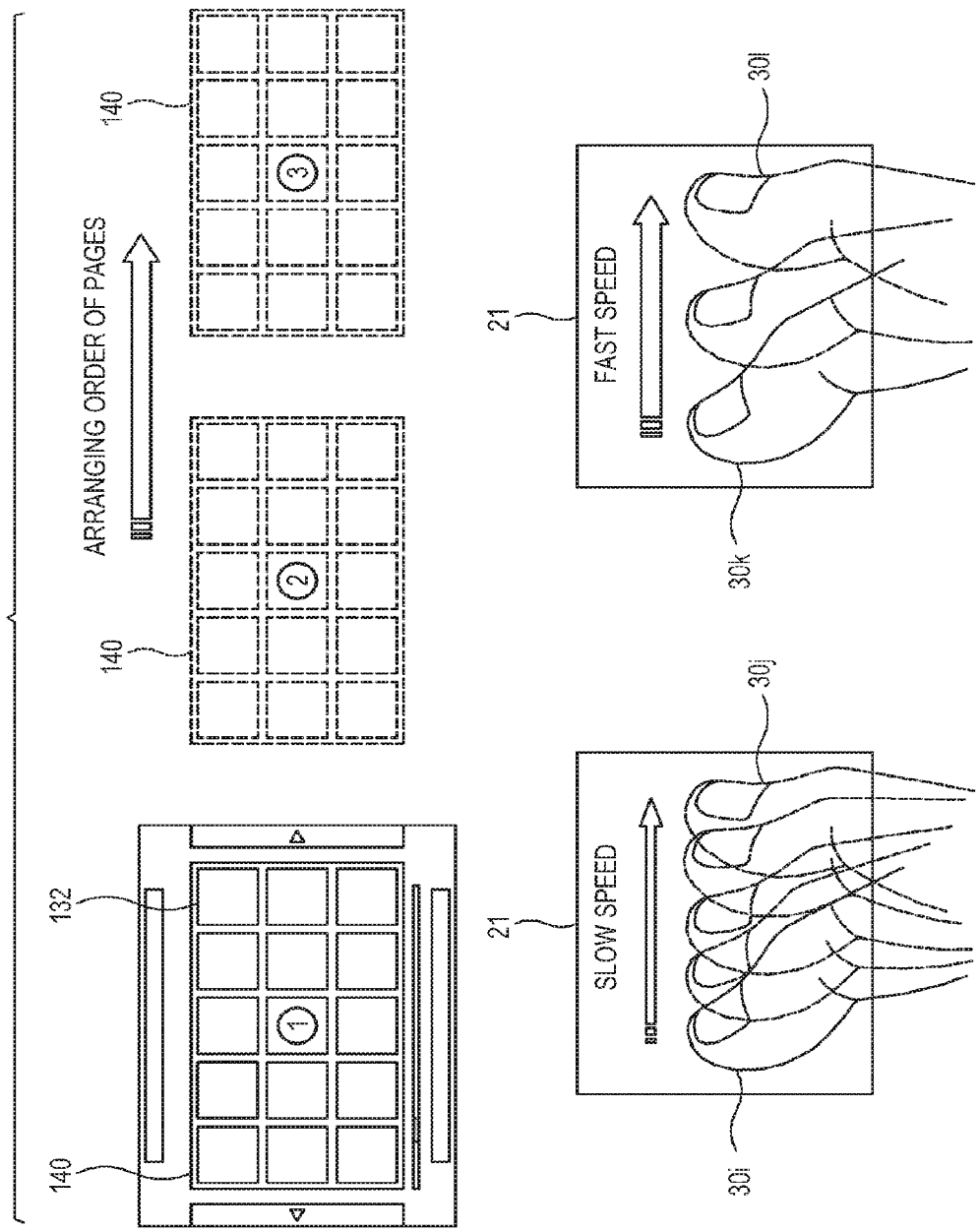

The main body controller 16 may determine a movement amount of the pages or categories or both corresponding to a user's motion on the contact surface 211 of the touch input unit 21. Specific factors which determine the foregoing movement amount include, e.g., a movement distance and speed of a user's motion on the contact surface 211. FIGS. 8 and 9 illustrate a movement amount of pages corresponding to each of the movement distance and speed of a user's motion. Like in FIG. 6, the group of UI items 140 which is expressed in solid lines in FIGS. 8 and 9 refers to a currently displayed page, and the two groups of UI items 140 which are expressed in a dotted line in FIGS. 8 and 9 refer to next pages. The reference numerals written in circles on the groups of UI items 140 refer to the arranging order of the pages (the order of 1, 2 and 3). FIGS. 8 and 9 illustrate only the movement between pages, but it should be noted that this may also apply to the movement between categories.

Referring to FIG. 8, motions on the touch input unit 21 in two cases are illustrated in a lower side in FIG. 8, and it is assumed that the motions in two cases are performed in the right direction (i.e., a group of UI items 140 moves to a next page corresponding thereto). Reference numerals 30e and 30f in the left bottom in FIG. 8 refer to a location of a user's finger corresponding to a starting point and an ending point of a smaller motion, and reference numerals 30g and 30h in the right bottom in FIG. 8 refer to a location of a user's finger corresponding to a starting point and an ending point of a larger motion. That is, the former corresponds to a shorter movement distance of the motion, and the latter corresponds to a longer movement distance of the motion. The main body controller 16 may determine the movement amount so that the page moves further when the movement distance of the motion is longer than when the movement distance of the motion is shorter. For example, while the group of UI items 140 of the page with the arranging order of 1 are being displayed, the main body controller 16 may change the currently displayed group of UI items 140 to the group of UI items 140 of the page with the arranging order of 2 corresponding to the shorter movement distance of the motion. The main body controller 16 may change the currently displayed group of UI items 140 to the group of UI items 140 of a page with an arranging order of 3 arranged after the arranging order of 2 corresponding to a longer movement distance of the motion.

In another example, referring to FIG. 9, motions on the touch input unit 21 in two cases are illustrated in a lower side in FIG. 9, and it is assumed that the motions in two cases are performed in the right direction (i.e., a group of UI items 140 move to a next page corresponding thereto). Reference numerals 30i and 30j in the left bottom in FIG. 9 refer to a location of a user's finger corresponding to a starting point and an ending point of a slower motion, and reference numerals 30k and 30l in the right bottom in FIG. 9 refer to a location of a user's finger corresponding to a starting point and an ending point of a faster motion. That is, the former corresponds to a slower motion speed, and the latter corresponds to a faster motion speed. The main body controller 16 may determine the movement amount so that the page moves further when the motion speed is faster than when the motion speed is slower. For example, while the group of UI items 140 of the page with the arranging order of 1 is being displayed, the main body controller 16 may change the currently displayed group UI items 140 to the group of UI items 140 of the page with the arranging order of 2 corresponding to the slower motion speed. The main body controller 16 may change the currently displayed group of UI items 140 to the group of UI items 140 of a page with an arranging order of 3 arranged after the arranging order of 2 corresponding to a faster motion speed.

In any case, the movement amount of the page corresponding to one-time motion is not specifically limited, and only one page or several pages may move depending on the degree of a user's motion. Accordingly, in the display apparatus 1 according to the exemplary embodiment, a user may promptly and conveniently search numerous contents only by a user's intuitive and simple motion on the touch input unit 21.

Figure 10:
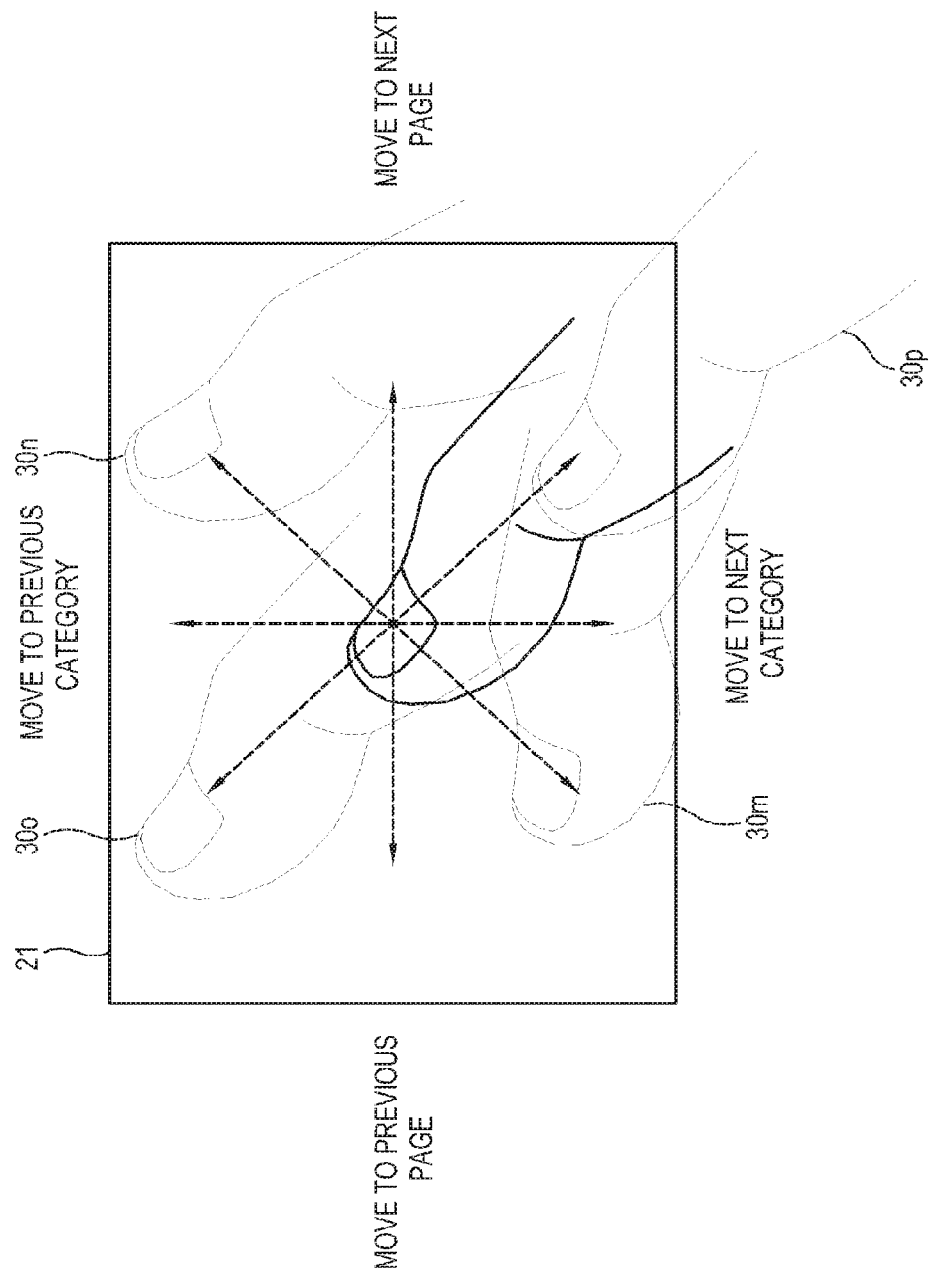
FIG. 10 illustrates another example of a user's motion commanding a movement of a page or a category or both through the touch input unit in FIG. 3.
Figure 11:
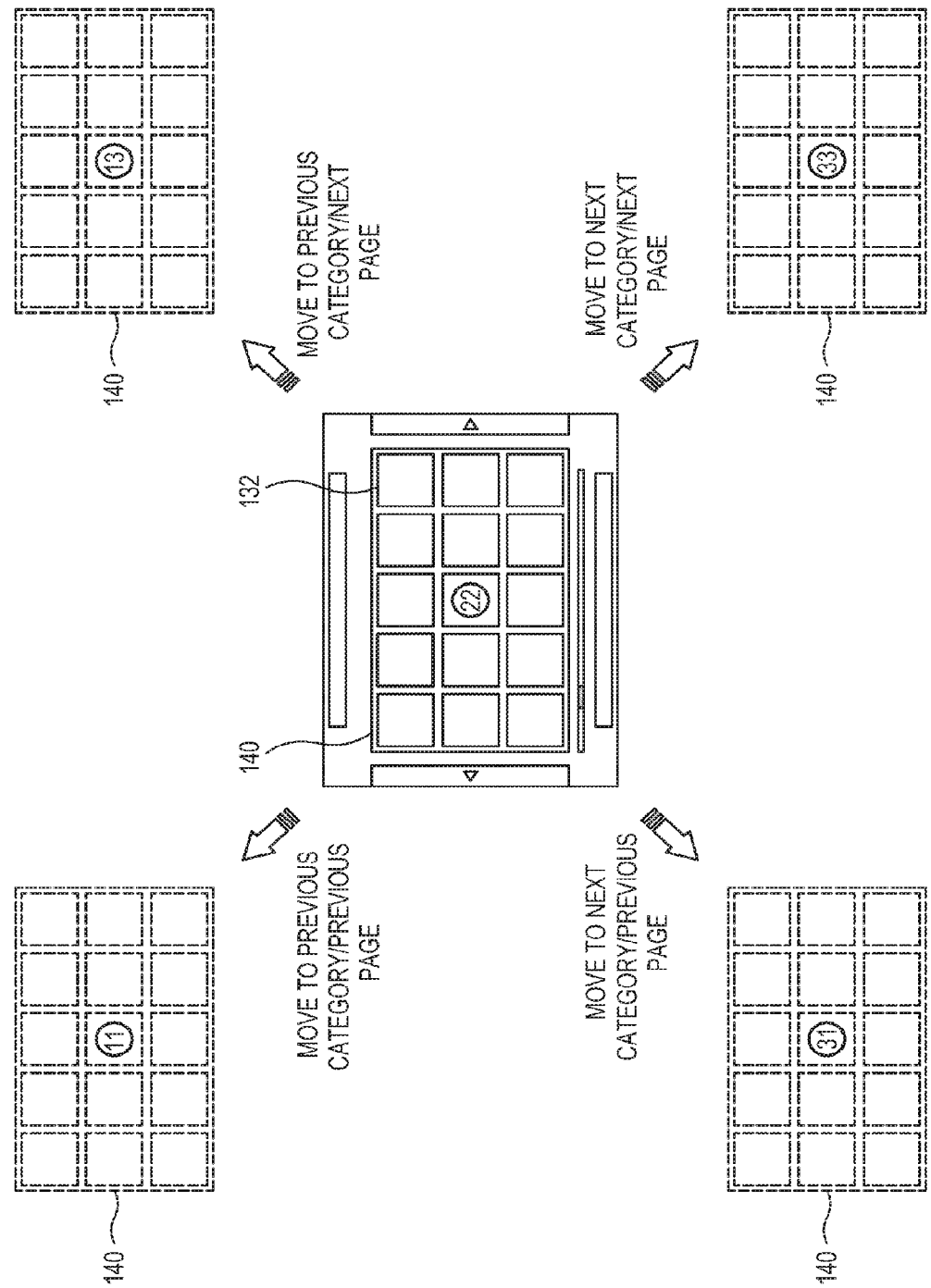
FIG. 11 illustrates details of the movement of the page and the category corresponding to the user's motion in FIG. 10.

Referring to FIGS. 10 and 11, a display apparatus 1 according to another exemplary embodiment will be described. FIG. 10 illustrates another example of a user's motion commanding a movement of pages and categories by using the touch input unit 21. As shown therein, a user's motion commanding the movement of the page, category, or both page and category is not limited to up and down and left and right directions, and may include a diagonal direction (refer to arrows, and reference numerals 30m, 30n, 30o and 30p in FIG. 10). If it is determined that a user's motion is performed in a diagonal direction, the main body controller 16 may take such motion as a combination of a motion in the left and right direction, e.g., a horizontal direction, and a motion in the up and down direction, e.g., a vertical direction, and may determine a movement amount of each of the page and category corresponding thereto. For example, if a user's motion is performed in a diagonal direction toward an upper right side 30n, the main body controller 106 may change to display the group of UI items 140 of a next page and a previous category. FIG. 11 illustrates a detailed movement of the page and category corresponding to the user's motion in FIG. 10. A group of UI items 140 which is expressed in solid lines in FIG. 11 refers to a currently displayed page and category, and the groups of UI items 140 which are expressed in dotted lines refers to a previous or next page or previous or next category. Reference numerals written in circles in the groups of UI items 140 refer to an arranging order of the page or category. For example, a movement between pages may occur in the arranging order of 11 and 13 or 31 and 33, and a movement between categories may occur in an arranging order of 11 and 31, or 13 and 33.

Figure 12:
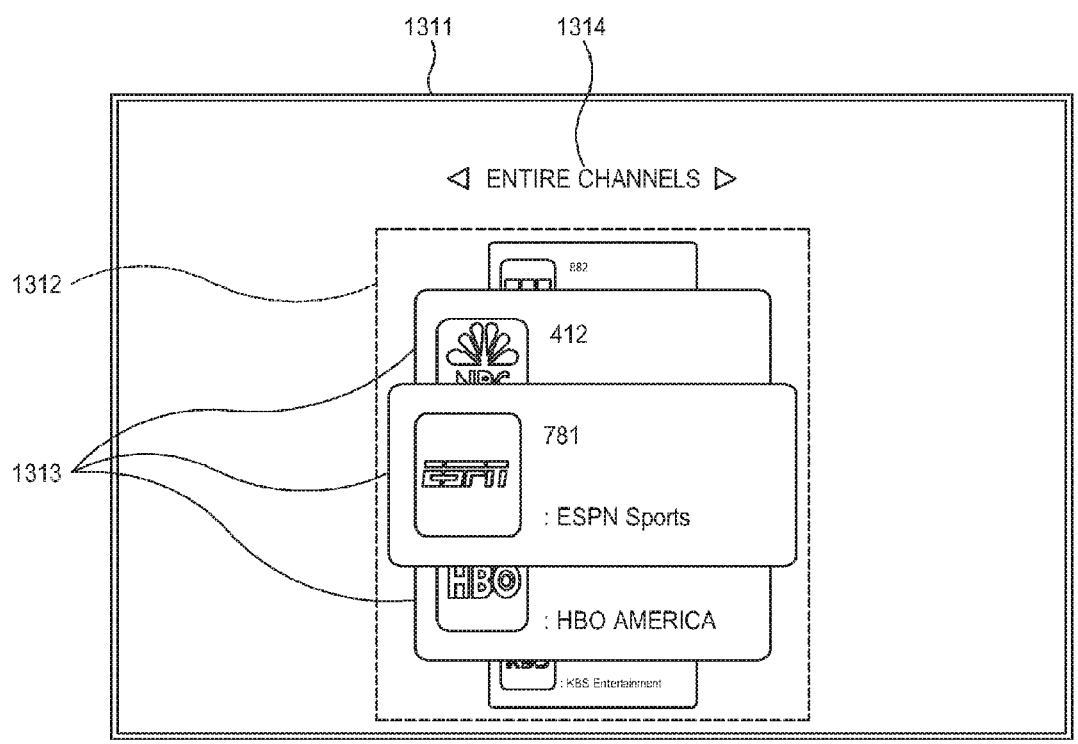
FIG. 12 illustrates a UI menu displayed by the display apparatus in FIGS. 1 and 2.

Hereinafter, the display apparatus 1 according to another exemplary embodiment will be described. The display apparatus 1 may provide a simple UI menu to search another channel while a user views a certain content (hereinafter, to be also called "channel"). FIG. 12 illustrates a simple UI menu according to the exemplary embodiment. A reference numeral 1311 in FIG. 12 refers to an image of a currently viewed channel, and a reference numeral 1312 refers to a simple UI menu for a channel search. As shown therein, the simple UI menu 1312 includes a plurality of UI items 1313, each of which displays information of channels such as a channel name and a channel number. The plurality of UI items 1313 are arranged in a 3D band, e.g., are overlapping in a step-wise arrangement, and one UI item of the plurality of UI items 1313 which corresponds to a currently viewed channel is located foremost.

Displaying the simple UI menu 1312 may start or end by a user's command while a user views an image 1311 of the channel. For example, if a user touches as in (a) of FIG. 3 through the touch input unit 21 while viewing the image 1311 of the channel, the UI menu 1312 may start being displayed. If a user touches again as in (a) of FIG. 3 while the UI menu 1312 is displayed, the UI menu 1312 may end, i.e., stop, being displayed.

The plurality of UI items 1313 may be changed and displayed by a user's command. For example, in the case of an input in a downward direction, a channel 781 that is located foremost moves a step below and at the same time a channel 412, which was one step below the channel 781, moves to the foremost location. In this case, a background image 1311 may be changed to the channel 412 at the same time. The change of the channel may be performed by a user's command using the key input unit 22 or the touch input unit 21. Particularly, the main body controller 16 may determine the movement amount of the plurality of UI items 1313 according to a user's motion on the touch input unit 21. In this case, the user's motion may be performed in an up and down direction. The movement amount of the plurality of the UI items 1313 according to the present exemplary embodiment may be the same as that in the foregoing exemplary embodiment, and thus the detailed description will be omitted.

The channel which is displayed through the plurality of UI items 1313 may be classified into a predetermined category, which is changed and displayed by a user's command. The UI menu 1312 may display information 1314 of a category to which a current channel belongs. The main body controller 16 may change the category of the plurality of UI items 1313 according to a user's motion on the touch input unit 21. In this case, the user's motion may be performed in a left and right direction. The change and movement amount of the category of the plurality of UI items 1313 according to the present exemplary embodiment are the same as those according to the foregoing exemplary embodiment, and the detailed description will be omitted. In the display apparatus 1 according to the exemplary embodiment, a user may conveniently and promptly search another channel while viewing a channel with an intuitive and simple motion on the touch input unit 21.

Figure 13:
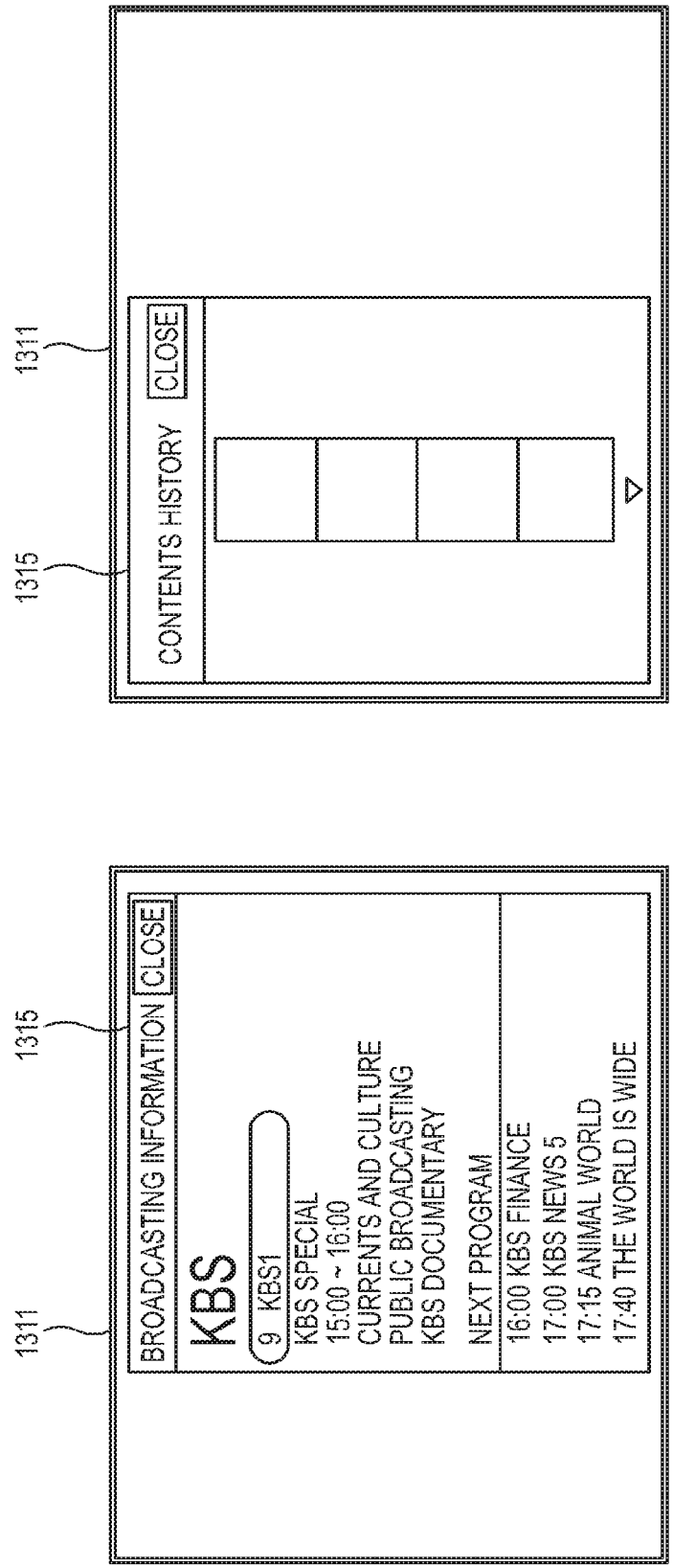
FIG. 13 illustrates an example of a channel information window displayed by the display apparatus in FIGS. 1 and 2.

Referring to FIGS. 13 to 15, a display apparatus 1 according to another exemplary embodiment will be described. The display apparatus 1 may display a channel information window to provide channel information while a user views an image of a certain channel. FIG. 13 illustrates two examples of a channel information window 1315 according to the exemplary embodiment. As shown therein, the channel information window 1315 is shaped like a rectangle, i.e., a window, and may overlap a part of an image 1311 of the channel. The channel information window 1315 may include information of other channels, a viewing history and other various channel information as well as a currently viewed channel.

Figure 14A:
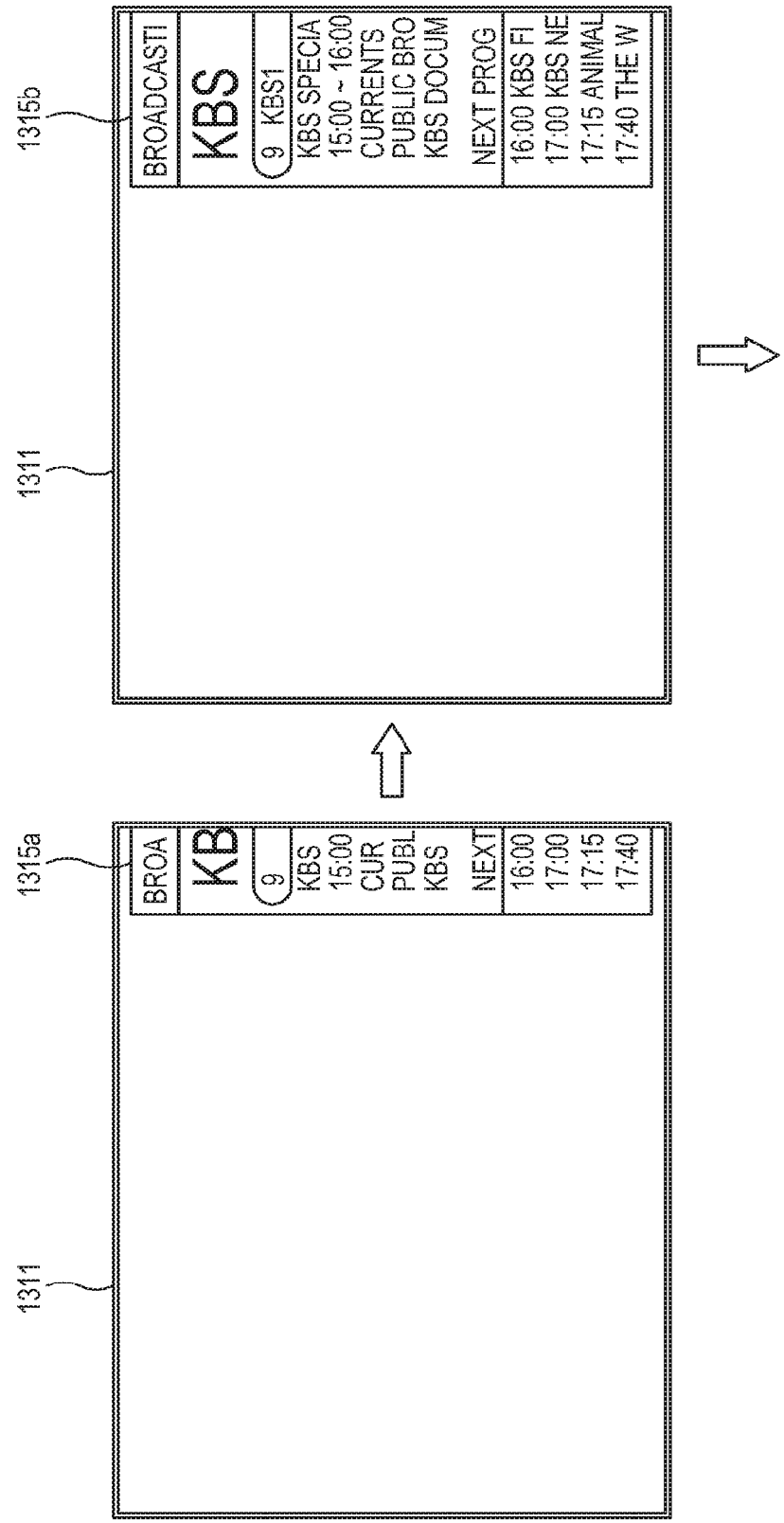

Starting and ending the display of the channel information window 1315 may be performed by a user's motion on the touch input unit 21. FIGS. 14A and 14B illustrate starting a display of the channel information window 1315 according to the exemplary embodiment. FIGS. 15A and 15B illustrate ending, or stopping, the display of the channel information window 1315. Referring to FIG. 14B, a user's motion on the touch input unit 21 is illustrated in a left side in FIG. 14B to start displaying the channel information window 1315. Reference numerals 30q and 30r refer to a location of a user's finger corresponding to a starting point and an ending point of the motion when the channel information window 1315 is displayed. As shown therein, a user's finger moves from a right corner 21a, or right edge, of the touch input unit 21 to the inside of the touch input unit as if it enters thereinto. The main body controller 16 may display the channel information window 1315 as if the window 1315 enters from the right corner of the screen to the inside thereof if it is determined that a user's motion is performed during the viewing of the channel image 1311 as shown in a left side in FIG. 14B (refer to reference numerals 1315a, 1315b and 1315c in FIGS. 14A and 14B).

Referring to FIGS. 15A and 15B, a user's motion on the touch input unit 21 is illustrated in a left side in FIG. 15B to end, or stop, displaying the channel information window 1315. Reference numerals 30s and 30t refer to a location of a user's finger corresponding to a starting point and an ending point of the motion when the display of the channel information window 1315 ends. As shown therein, a user's finger moves from an inside of the touch input unit 21 to the right corner 21a of the touch input unit 21 as if it escapes, or exits, therefrom. The main body controller 16 may end displaying the channel information window 1315 as if the window 1315 escapes, or exits, from the inside of the screen to the right corner of the screen if it is determined that a user's motion is performed during the display of the channel information window 1315 as shown in a left side in FIG. 15B (refer to reference numerals 1315d, 1315e and 1315f in FIGS. 15A and 15B).

In the foregoing exemplary embodiments, the channel information window 1315 enters into or exits from the right corner of the screen, but the movement is not limited thereto, and may vary. As above, in the display apparatus 1 according to the exemplary embodiment, a user may conveniently use the channel information with his/her intuitive and simple motion on the touch input unit 21.

Figure 16:
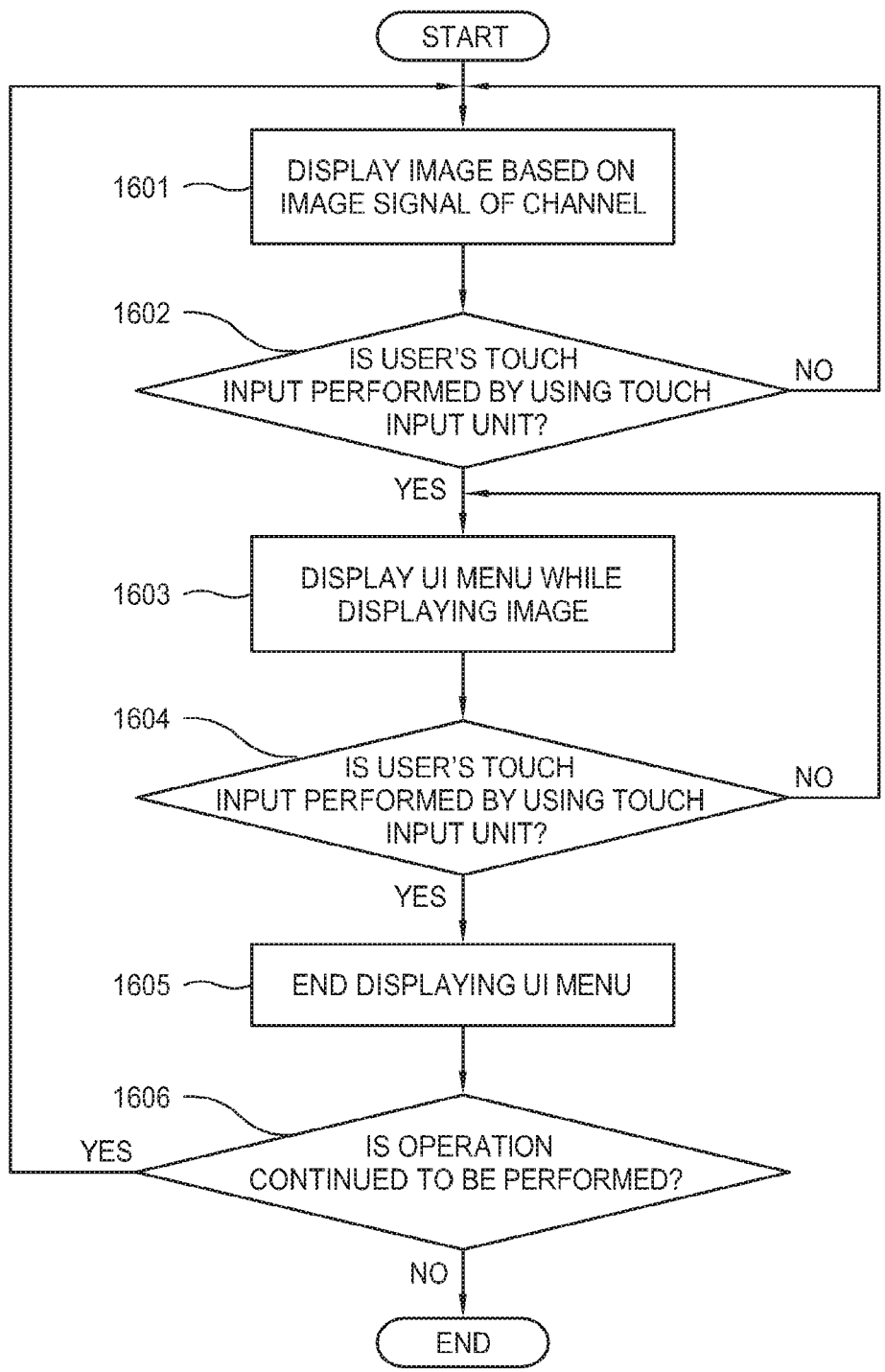

Hereinafter, a control method of the display apparatus 1 according to the exemplary embodiment will be described with reference to FIGS. 16 to 19. Referring to FIG. 16, the main body controller 16 controls the image signal receiver 11 to receive an image signal of a channel selected by a user, and controls the image processor 12 to display an image on the display unit 13 based on the image signal received by the image signal receiver 11 (1601).

The main body controller 16 determines whether a user's touch input is performed by using the touch input unit 21 while a user views the image of the channel (1602). If the user's touch input is not performed by using the touch input unit 21 (No at operation 1602), the main body controller 16 performs the operation 1601 again. If the user's touch input is performed by using the touch input unit 21 (Yes at operation 1602), the main body controller 16 displays the UI menu 131 or 1312 (refer to FIGS. 5 and 12) to search the channel while displaying the image (1603). The main body controller 16 performs the channel search by using the UI menu 131 or 1312 by a user's command.

The main body controller 16 determines whether a user's touch input is performed by using the touch input unit 21 while displaying the UI menu 131 or 1312 (1604). If the user's touch input is not performed by using the touch input unit 21 (No at operation 1604), the main body controller 16 performs the operation 1603 again. If the user's touch input is performed by using the touch input unit 21 (Yes at operation 1604), the main body controller 16 ends displaying the UI menu 131 or 1312 (1605). The main body controller 16 determines whether to continue to perform the operation (1606), and returns to the operation 1601 if it is determined to continue to perform the operation (Yes at operation 1606), and ends the operation if it is determined not to continue the operation (No at operation 1606).

Figure 17:
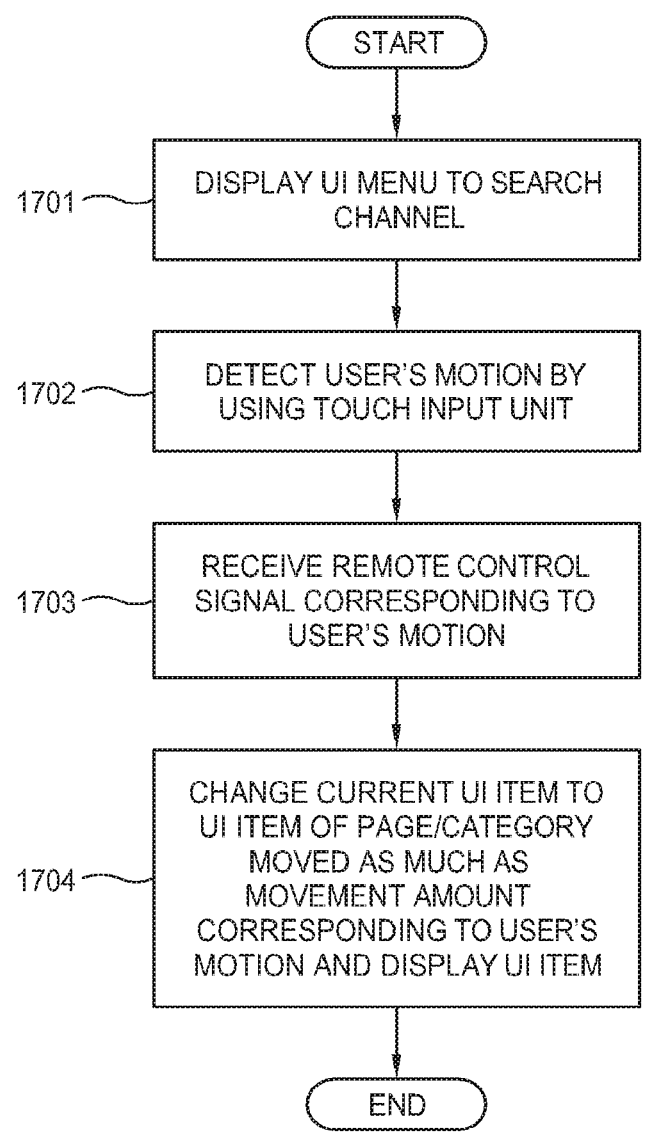

Referring to FIG. 17, the control method of the display apparatus 1 will be described. The display main body 10 displays the UI menu 131 or 1312 to search the channel by a user's command (1701). The remote control device 20 detects a user's motion on the touch input unit 21 (1702). The display main body 10 receives the remote control signal corresponding to the user's motion from the remote control device 20 (1703). Then, the display main body 10 determines the movement amount of the page, category, or both page and category of the group of UI items 140 or of the one UI item 1313 corresponding to the user's motion, and changes the currently displayed group of UI items 140 or the one UI item 1313 to the group of UI items 140 or the one UI item 1313 of the page and category moved to based on the determined movement amount, and displays the new page and category of the group of UI items 140 or the one UI item 1313 (1704).

Figure 18:
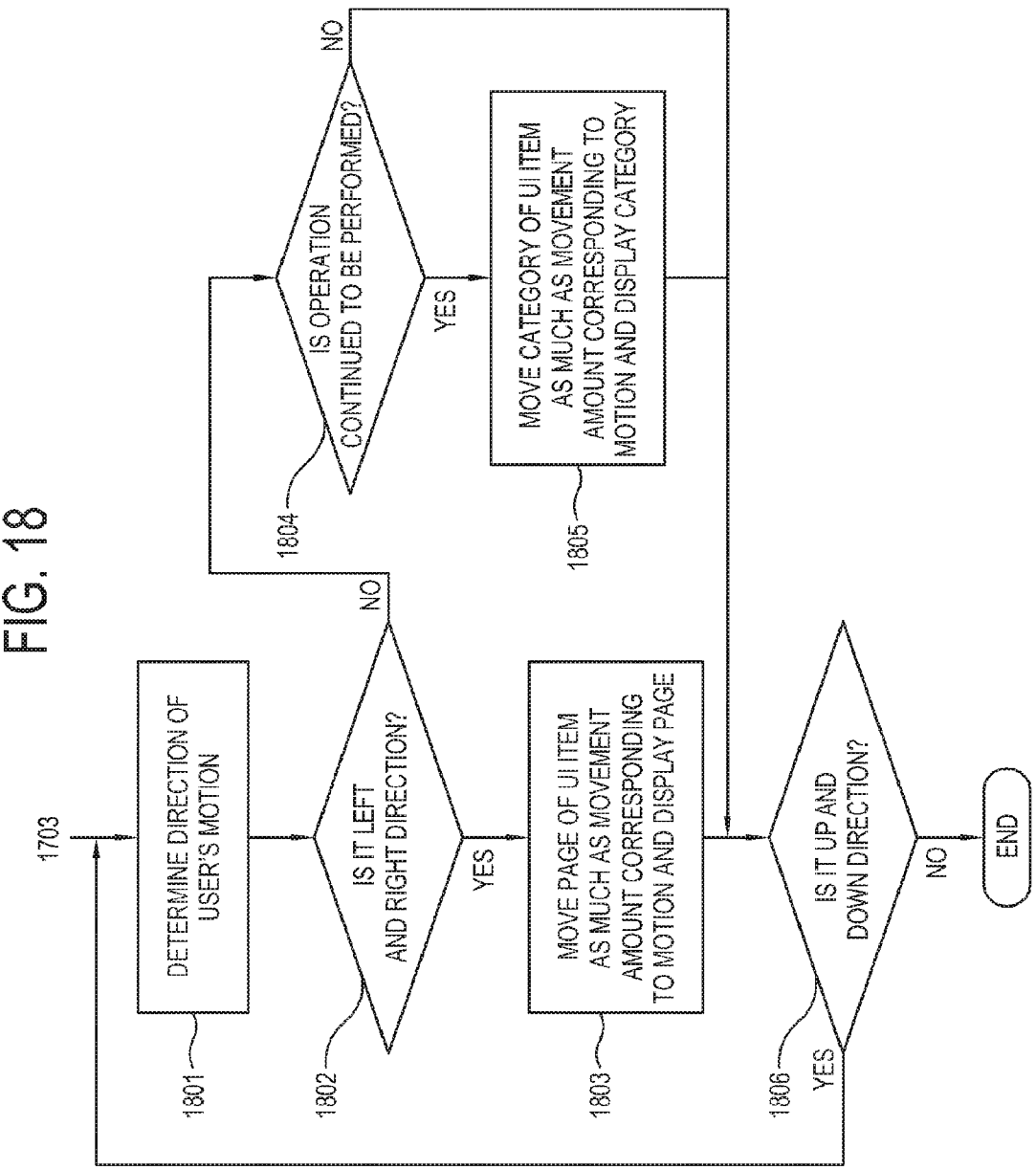

The operation 1704 in FIG. 17 will be described in more detail with reference to FIG. 18. The main body controller 16 analyzes the user's motion and identifies the direction of the motion (1801). If it is determined at operation 1801 that the motion is performed in the left and right direction (Yes at operation 1802), the main body controller 16 moves the page of the group of UI items 140 or the one UI item 1313 based on the movement amount corresponding to the motion, and displays the group of UI items 140 or the one UI item 1313 (1803). If it is determined at operation 1801 that the motion is not performed in the left and right direction (No at operation 1802), but is performed in the up and down direction (Yes at operation 1804), the main body controller 16 moves the category of the group of UI items 140 or of the one UI item 1313 based on the movement amount corresponding to the motion and displays the new category of the group of UI items 140 or of the one UI item 1313 (1805). If the direction of the motion is not the left and right direction nor the up and down direction (No at operation 1804), the main body controller 16 determines whether to continue to perform the operation (1806), and returns to the operation 1801 if it is determined to continue to perform the operation (Yes at operation 1806), and ends the operation if it is determined not to continue the operation (No at operation 1806). According to the present exemplary embodiment, the direction of the motion is considered the left and right direction and the up and down direction, but the direction is not limited thereto, and may further include the diagonal direction as described with reference to FIGS. 10 and 11.

Another control method of the display apparatus 1 will be described with reference to FIG. 17. The display apparatus 1 displays an image based on an image signal of the channel selected by a user (1901). The display apparatus 1 detects a user's touch input by using the touch input unit 21 while displaying the image (1902). If it is determined at operation 1902 that the touch input does not include a motion performed from a corner, or edge, of the touch input unit 21 to an inside thereof (No at operation 1903), the operation 1901 is performed again. If the touch input includes a motion performed from the corner of the touch input unit 21 to the inside thereof (Yes at operation 1903), the display apparatus 1 displays the channel information window 1315 as if the window 1315 enters into the screen while displaying the image (1904).

The display apparatus 1 detects the user's touch input by using the touch input unit 21 while displaying the image (1905). If it is determined at operation 1905 that the touch input does not include a motion performed from the inside of the touch input unit 21 to the corner, or edge, thereof (No at operation 1906), the operation 1905 is performed again. If the touch input includes the motion from the inside of the touch input unit 21 to the corner or edge thereof (Yes at operation 1906), the display apparatus 1 ends displaying the channel information window 1315 as if the window 1315 exits from the screen to an outside thereof (1904). The display apparatus 1 determines whether to continue to perform the operation (1908), and returns to the operation 1901 if it is determined to continue to perform the operation (Yes at operation 1908), and ends the operation if it is determined not to continue the operation (No at operation 1908).

As described above, a display apparatus and a control method thereof according to the exemplary embodiments enable a user to search a desired image content more conveniently and promptly.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display device comprising:
   a display;
   a communicator configured to receive a wireless signal corresponding to a touch input detected by a touch input unit of an input device; and
   a controller configured to control the display to:
   provide a user interface (UI) menu including a plurality of pages, each of the plurality of pages including a plurality of UI items and belonging to a respective one of a plurality of categories;
   in response to receiving, from the input device via the communicator, wireless signals corresponding to a first touch input moving in a first input direction from a lower region of the touch input unit to an inside region of the touch input unit, display a first page of a first category by sliding in the first page over a content image displayed on the display, the first page of the first category comprising a plurality of first UI items;

display a first indicator representing a selection of a first UI item from among the plurality of first UI items while the first page is displayed;

display a second indicator representing a selection of a second UI item from among the plurality of first UI items, in response to receiving, from the input device via the communicator, wireless signals corresponding to a second touch input moving in a second input direction which is approximately perpendicular to the first input direction; and display a second page of a second category, in response to receiving, from the input device via the communicator while the first page of the first category is displayed, wireless signals corresponding to a third touch input moving in a third input direction which is approximately parallel to the first input direction, where in one of the plurality of categories comprises UI items indicating television channels arranged in grid.

2. The display device according to claim 1, wherein the controller is further configured to control the display to display a second UI over the content image proximate an upper edge of the display in response to wireless signals received from the input device indicating a fourth touch input moving from an upper portion of the touch input unit to the inside region of the touch input unit.

3. The display device according to claim 1, further comprising an image signal receiver configured to receive an image signal corresponding to the content image.

4. The display device according to claim 1, wherein each of the plurality of first UI items comprise a thumbnail image.

5. The display device according to claim 1, wherein the plurality of first UI items are arranged in a grid.

6. The display device according to claim 1, wherein each of the plurality of first UI items comprises a thumbnail image, and
wherein the plurality of first UI items are arranged in a grid.

7. A control method of a display device, the control method comprising:
communicating with an input device having a touch input unit for detecting a touch input;
displaying a content image on a display of the display device;
providing a user interface (UI) menu including a plurality of pages, each of the plurality of pages including a plurality of UI items and belonging to a respective one of a plurality of categories;
in response to receiving, from the input device, wireless signals corresponding to a first touch input moving in a first input direction from a lower region of the touch input unit to an inside region of the touch input unit, displaying a first page of a first category by sliding in the first page over the content image displayed on the display, the first page of the first category comprising a plurality of first UI items;
displaying a first indicator representing a selection of a first UI item from among the plurality of first UI items while the first page is displayed;
displaying a second indicator representing a selection of a second UI item from among the plurality of first UI items, in response to receiving, from the input device, wireless signals corresponding to a second touch input moving in a second input direction which is approximately perpendicular to the first input direction; and
displaying a second page of a second category, in response to receiving, from the input device while the first page of the first category is displayed, wireless signals corresponding to a third touch input moving in a third input direction which is approximately parallel to the first input direction,
where in one of the plurality of categories comprises UI items indicating television channels arranged in grid.

8. The control method according to claim 7, wherein further comprising:
displaying a second UI over the content image proximate an upper edge of the display in response to wireless signals received from the input device indicating a fourth touch input moving from an upper portion of the touch input unit to the inside region of the touch input unit.

9. A system comprising:
an input device having a touch input unit; and
a display device comprising:
a display;
a communicator configured to receive a wireless signal corresponding to a touch input detected by the touch input unit of the input device; and
a controller configured to control the display to:
provide a user interface (UI) menu including a plurality of pages, each of the plurality of pages including a plurality of UI items and belonging to a respective one of a plurality of categories;
in response to receiving, from the input device via the communicator, wireless signals corresponding to a first touch input moving in a first input direction from a lower region of the touch input unit to an inside region of the touch input unit, display a first page of a first category by sliding in the first page over a content image displayed on the display, the first page of the first category comprising a plurality of first UI items;
display a first indicating representing a selection of a first UI item from among the plurality of first UI items while the first page is displayed;
display a second indicator representing a selection of a second UI item from among the plurality of first UI items, in response to receiving, from the input device via the communicator, wireless signals corresponding to a second touch input moving in a second input direction which is approximately perpendicular to the first input direction; and
display a second page of a second category, in response to receiving, from the input device via the communicator while the first page of the first category is displayed, wireless signals corresponding to a third touch input moving in a third input direction which is approximately parallel to the first input direction,
where in one of the plurality of categories comprises UI items indicating television channels arranged in grid.

10. The system according to claim 9, wherein the controller is further configured to control the display to display a second UI over the content image proximate an upper edge of the display in response to wireless signals received from the input device indicating a fourth touch input moving from an upper portion of the touch input unit to the inside region of the touch input unit.

11. non-transitory computer-readable recording medium storing instructions of a method to be executed by a processor of a display device, the method comprising:
communicating with an input device having a touch input unit for detecting a touch input;
displaying a content image on a display of the display device;
providing a user interface (UI) menu including a plurality of pages, each of the plurality of pages including a plurality of UI items and belonging to a respective one of a plurality of categories;
in response to receiving, from the input device, wireless signals corresponding to a first touch input moving in a first input direction from a lower region of the touch input unit to an inside region of the touch input unit, displaying a first page of a first category by sliding in the first page over the content image displayed on the display, the first page of the first category comprising a plurality of first UI items;
displaying a first indicator representing a selection of a first UI item from among the plurality of first UI items while the first page is displayed;
displaying a second indicator representing a selection of a second UI item from among the plurality of first UI items, in response to receiving, from the input device, wireless signals corresponding to a second touch input moving in a second input direction which is approximately perpendicular to the first input direction; and
displaying a second page of a second category, in response to receiving, from the input device while the first page of the first category is displayed, wireless signals corresponding to a third touch input moving in a third input direction which is approximately parallel to the first input direction,
where in one of the plurality of categories comprises UI items indicating television channels arranged in grid.

* * * * *